(12) United States Patent
Mermel et al.

(10) Patent No.: US 12,548,570 B1
(45) Date of Patent: Feb. 10, 2026

(54) NEURAL FOUNDATION MODELS FOR BRAIN-COMPUTER INTERFACE

(71) Applicant: PRECISION NEUROSCIENCE CORPORATION, New York, NY (US)

(72) Inventors: Craig Mermel, New York, NY (US); Benjamin Rapoport, New York, NY (US); Ramin Anushiravani, New York, NY (US); Yoon Woo Byun, New York, NY (US); David Gutschick, Sunnyvale, CA (US)

(73) Assignee: PRECISION NEUROSCIENCE CORPORATION, New York, NY (US)

( * ) Notice: Subject to any disclaimer, the term of this patent is extended or adjusted under 35 U.S.C. 154(b) by 0 days.

(21) Appl. No.: 19/062,356

(22) Filed: Feb. 25, 2025

(51) Int. Cl.
*G10L 25/30* (2013.01)
*G06F 3/01* (2006.01)
*G10L 15/24* (2013.01)

(52) U.S. Cl.
CPC .............. *G10L 15/24* (2013.01); *G06F 3/015* (2013.01); *G10L 25/30* (2013.01)

(58) Field of Classification Search
CPC ....................................................... G10L 15/24
USPC ....................................................... 704/231
See application file for complete search history.

(56) References Cited

U.S. PATENT DOCUMENTS

| | | |
|---|---|---|
| 5,709,689 A | 1/1998 | Ferrante et al. |
| 5,910,282 A | 6/1999 | Grozdanovski et al. |
| 6,831,991 B2 | 12/2004 | Fridrich et al. |
| 7,389,144 B1 | 6/2008 | Osorio et al. |
| 7,818,061 B1 | 10/2010 | Palmer |
| 7,925,350 B1 | 4/2011 | Palmer |
| 8,156,568 B2 | 4/2012 | Gaitas et al. |
| 8,170,670 B2 | 5/2012 | Stubbs et al. |
| 8,515,538 B1 | 8/2013 | Osorio et al. |
| 8,516,568 B2 | 8/2013 | Cohen |
| 8,546,568 B2 | 10/2013 | Inouye et al. |

(Continued)

FOREIGN PATENT DOCUMENTS

| | | |
|---|---|---|
| AU | 2020428944 A1 | 9/2022 |
| CN | 110876652 A | 3/2020 |

(Continued)

OTHER PUBLICATIONS

A Fully Differentiable Beam Search Decoder Ronan Collobert, Awni Hannun, Gabriel Synnaeve 2019 (Year: 2019).*

(Continued)

*Primary Examiner* — Bharatkumar S Shah
(74) *Attorney, Agent, or Firm* — DLA Piper LLP US

(57) ABSTRACT

A method and system for decoding speech based on recorded brain signals is provided. The method can include receiving recorded brain signals via a microelectrode array. The method can include extracting one or more features from the recorded brain signals. The method can include converting the one or more extracted features into one or more feature embeddings. The method can include transforming, by one or more encoders, the one or more feature embeddings. The method can include predicting, by one or more decoders, phonemes based on the one or more transformed feature embeddings. The method can include predicting speech based on the predicted phonemes.

20 Claims, 25 Drawing Sheets

(56) References Cited

U.S. PATENT DOCUMENTS

| | | | |
|---|---|---|---|
| 8,634,918 B2 | 1/2014 | Chambers | |
| 9,314,618 B2 | 4/2016 | Imran et al. | |
| 9,549,704 B1 | 1/2017 | Buerger et al. | |
| 10,135,849 B2 | 11/2018 | Jha et al. | |
| 10,265,081 B2 | 4/2019 | Kennedy et al. | |
| 10,363,420 B2 | 7/2019 | Fried et al. | |
| 11,013,923 B1 | 5/2021 | Eubanks | |
| 11,185,684 B2 | 11/2021 | Cadwell | |
| 11,640,204 B2 * | 5/2023 | Shenoy | G06N 3/044 |
| | | | 345/156 |
| 12,008,987 B2 * | 6/2024 | Stavisky | G06N 20/10 |
| 2001/0054758 A1 | 12/2001 | Isaak | |
| 2003/0057506 A1 | 3/2003 | Li et al. | |
| 2005/0228421 A1 | 10/2005 | Bilenski et al. | |
| 2005/0261934 A1 | 11/2005 | Thompson | |
| 2006/0015153 A1 | 1/2006 | Gliner et al. | |
| 2006/0106431 A1 | 5/2006 | Wyler et al. | |
| 2006/0253163 A1 | 11/2006 | Stubbs et al. | |
| 2007/0005691 A1 | 1/2007 | Pushparaj | |
| 2007/0282398 A1 | 12/2007 | Healy et al. | |
| 2009/0082829 A1 | 3/2009 | Panken et al. | |
| 2009/0088763 A1 | 4/2009 | Aram et al. | |
| 2009/0132061 A1 | 5/2009 | Stubbs et al. | |
| 2009/0312817 A1 * | 12/2009 | Hogle | A61B 5/682 |
| | | | 607/54 |
| 2011/0093052 A1 | 4/2011 | Anderson et al. | |
| 2011/0245835 A1 | 10/2011 | Dodds et al. | |
| 2012/0139269 A1 | 6/2012 | Kouzuma | |
| 2012/0277834 A1 | 11/2012 | Mercanzini et al. | |
| 2012/0302959 A1 | 11/2012 | Fielder et al. | |
| 2013/0014982 A1 | 1/2013 | Segawa et al. | |
| 2013/0144362 A1 | 6/2013 | Lee | |
| 2013/0144365 A1 | 6/2013 | Kipke et al. | |
| 2013/0331856 A1 | 12/2013 | Sage et al. | |
| 2014/0051960 A1 | 2/2014 | Badower et al. | |
| 2014/0100586 A1 | 4/2014 | Pianca et al. | |
| 2014/0194944 A1 | 7/2014 | Romanelli et al. | |
| 2015/0111930 A1 | 4/2015 | Aung-Din | |
| 2015/0151114 A1 | 6/2015 | Black et al. | |
| 2015/0265180 A1 | 9/2015 | Venkatesan et al. | |
| 2015/0367122 A1 | 12/2015 | Morshed et al. | |
| 2016/0007874 A1 | 1/2016 | Ma et al. | |
| 2016/0120457 A1 | 5/2016 | Wu et al. | |
| 2016/0174863 A1 | 6/2016 | Foerster et al. | |
| 2016/0331994 A1 * | 11/2016 | Smith | A61N 5/0622 |
| 2017/0100580 A1 | 4/2017 | Olson | |
| 2017/0108926 A1 | 4/2017 | Moon et al. | |
| 2017/0113046 A1 | 4/2017 | Fried et al. | |
| 2017/0224908 A1 | 8/2017 | Hidem et al. | |
| 2017/0224980 A1 | 8/2017 | Grasso et al. | |
| 2017/0235663 A1 | 8/2017 | Kattepur et al. | |
| 2017/0246452 A1 | 8/2017 | Liu et al. | |
| 2017/0259072 A1 | 9/2017 | Newham et al. | |
| 2018/0078767 A1 | 3/2018 | Rapoport et al. | |
| 2018/0236221 A1 | 8/2018 | Opie et al. | |
| 2018/0332009 A1 | 11/2018 | Lange | |
| 2019/0110754 A1 | 4/2019 | Rao et al. | |
| 2019/0134396 A1 | 5/2019 | Toth et al. | |
| 2019/0150774 A1 | 5/2019 | Brinkmann et al. | |
| 2019/0333505 A1 * | 10/2019 | Stavisky | G10L 13/00 |
| 2020/0061374 A1 | 2/2020 | Mitchell | |
| 2020/0069427 A1 | 3/2020 | Swennen et al. | |
| 2020/0078586 A1 | 3/2020 | Wijesundara et al. | |
| 2020/0155828 A1 | 5/2020 | Shepard et al. | |
| 2020/0206503 A1 | 7/2020 | Ganzer et al. | |
| 2020/0215318 A1 | 7/2020 | Fielder et al. | |
| 2020/0222010 A1 | 7/2020 | Howard | |
| 2020/0310442 A1 | 10/2020 | Halder et al. | |
| 2020/0337579 A1 | 10/2020 | Auerbach et al. | |
| 2020/0364539 A1 | 11/2020 | Anisimov et al. | |
| 2021/0033559 A1 | 2/2021 | Panat et al. | |
| 2021/0034906 A1 | 2/2021 | Van Welzen et al. | |
| 2021/0085988 A1 | 3/2021 | Nin et al. | |
| 2021/0186450 A1 | 6/2021 | Vancamberg et al. | |
| 2021/0213279 A1 | 7/2021 | Rapoport et al. | |
| 2021/0252289 A1 | 8/2021 | Esteller | |
| 2021/0267523 A1 | 9/2021 | Donoghue et al. | |
| 2021/0267526 A1 | 9/2021 | Bishay et al. | |
| 2021/0268265 A1 | 9/2021 | Eder et al. | |
| 2021/0272687 A1 | 9/2021 | Klopfenstein et al. | |
| 2021/0275807 A1 | 9/2021 | Bouton | |
| 2021/0280309 A1 | 9/2021 | Klopfenstein et al. | |
| 2021/0353439 A1 | 11/2021 | Norman et al. | |
| 2022/0005465 A1 * | 1/2022 | Prabhavalkar | G06N 3/045 |
| 2022/0117511 A1 | 4/2022 | Shor et al. | |
| 2022/0175320 A1 | 6/2022 | Shah et al. | |
| 2022/0184403 A1 | 6/2022 | Chouinard et al. | |
| 2022/0208173 A1 | 6/2022 | Chang et al. | |
| 2022/0211312 A1 | 7/2022 | Brinkmann et al. | |
| 2022/0218264 A1 | 7/2022 | Brunner et al. | |
| 2022/0240833 A1 | 8/2022 | Oxley | |
| 2022/0301563 A1 | 9/2022 | Chang et al. | |
| 2022/0370805 A1 | 11/2022 | Cogan et al. | |
| 2022/0379117 A1 | 12/2022 | Spector | |
| 2022/0413612 A1 | 12/2022 | Gribetz | |
| 2023/0059718 A1 | 2/2023 | Hor-Lao et al. | |
| 2023/0062326 A1 | 3/2023 | Colachis et al. | |
| 2023/0111217 A1 | 4/2023 | Weiss | |
| 2023/0113727 A1 | 4/2023 | Van Der Zalm et al. | |
| 2023/0210427 A1 | 7/2023 | Rapoport et al. | |
| 2023/0253104 A1 | 8/2023 | Serruya et al. | |
| 2023/0271007 A1 | 8/2023 | Ganzer et al. | |
| 2023/0320417 A1 | 10/2023 | Renner et al. | |
| 2023/0389851 A1 * | 12/2023 | Tal | G06N 3/0442 |
| 2023/0414947 A1 | 12/2023 | Esteller | |
| 2024/0029717 A1 | 1/2024 | Jain et al. | |
| 2024/0115178 A1 | 4/2024 | Rapoport | |
| 2024/0139512 A1 | 5/2024 | Schulhauser et al. | |
| 2024/0374893 A1 | 11/2024 | Robinson et al. | |
| 2024/0399152 A1 | 12/2024 | Powell et al. | |
| 2024/0412030 A1 * | 12/2024 | Guinn et al. | G06N 3/006 |
| 2025/0010070 A1 | 1/2025 | Ganzer et al. | |

FOREIGN PATENT DOCUMENTS

| | | | |
|---|---|---|---|
| KR | 20200074951 A | 6/2020 | |
| WO | WO-2008052166 A2 * | 5/2008 | A61N 1/36082 |
| WO | 2012143850 A1 | 10/2012 | |
| WO | 2015191628 A1 | 12/2015 | |
| WO | 2015195553 A1 | 12/2015 | |
| WO | 2017160627 A2 | 9/2017 | |
| WO | 2017196971 A1 | 11/2017 | |
| WO | 2019079475 A1 | 4/2019 | |
| WO | 2019152648 A1 | 8/2019 | |
| WO | 2019211314 A1 | 11/2019 | |
| WO | 2020008016 A1 | 1/2020 | |
| WO | 2020008017 A1 | 1/2020 | |
| WO | 2020142384 A1 | 7/2020 | |
| WO | WO-2020219371 A1 * | 10/2020 | A61B 5/1114 |
| WO | WO-2021021714 A1 * | 2/2021 | A61F 4/00 |
| WO | 2021055682 A1 | 3/2021 | |
| WO | 2021162795 A1 | 8/2021 | |
| WO | 2021174061 A1 | 9/2021 | |
| WO | 2022011260 A1 | 1/2022 | |
| WO | 2022126059 A1 | 6/2022 | |
| WO | 2022251151 A1 | 12/2022 | |
| WO | WO-2024254360 A1 * | 12/2024 | |

OTHER PUBLICATIONS

Z. S. Chen and X. Li, "Emerging Brain-to-Content Technologies From Generative AI and Deep Representation Learning [In the Spotlight]," in IEEE Signal Processing Magazine, vol. 41, No. 6, pp. 94-104, Nov. 2024, doi: 10.1109/MSP.2024.3484629. keywords: {Generative AI;Artificial intelligence;Deep learni (Year: 2024).*

Anumanchipalli et al, "Speech Synthesis from neural decoding of spoken sentences", Nature, vol. 568, No. 7753, pp. 493-498, Apr. 2019.

Duraivel et al, "High-resolution neural recordings improve the accuracy of speech decoding", Nature Communications, vol. 14, No. 6938, 16 pages, Nov. 6, 2023.

(56) References Cited

OTHER PUBLICATIONS

Inclusive Technology, "Inclusive EyeGaze Education with myGaze Eye Tracker—Discontinued", Spectronics, https://www.spectronics.com.au/product/inclusive-eyegaze-education-with-mygaze-eye-tracker#mygaze, 8 pages, retrieved from the Internet Feb. 25, 2025.
Meta, "AI Speech Research Voicebox: Text-Guided Multilingual Universal Speech Generation at Scale", https://voicebox.metademolab.com/, 8 pages, (2023), retrieved from the Internet Feb. 25, 2025.
Defossez et al, "Decoding speech perception from non-invasive brain recordings", Nature Machine Intelligence, vol. 5, pp. 1097-1107, Oct. 2023.
Alim et al, "Some Commonly Used Speech Feature Extraction Algorithms", IntechOpen, ch. 1, 18 pages, (2018).
Camara C., et al., "Security and Privacy Issues in Implantable Medical Devices: A Comprehensive Survey," Journal of Biomedical Informatics, Jun. 11, 2015, vol. 55, 45 pages.
Haufe S., et al., "Elucidating Relations Between Fmri, Ecog and Eeg Through a Common Natural Stimulus," Publication bioR/iv. Oct. 22, 2017.
Hettick M., et al., "The Layer 7 Cortical Interface: a Scalable and Minimally Invasive Brain-computer Interface Platform," bioRxiv, Jan. 30, 2024, 42 pages.
International Preliminary Report on Patentability for Application No. PCT/US2022/78130, mailed on Apr. 25, 2024, 8 Pages.
International Preliminary Report on Patentability for the Application No. PCT/US2023/035620, mailed May 1, 2025, 9 pages.
International Preliminary Report on Patentability for the Application No. PCT/US2023/035623, mailed May 1, 2025, 9 pages.
International Preliminary Report on Patentability for the Application No. PCT/US2023/035624, mailed May 1, 2025, 9 pages.
International Preliminary Report on Patentability for the Application No. PCT/US2023/035625, mailed May 1, 2025, 7 pages.
International Preliminary Report on Patentability for the Application No. PCT/US2023/035627, mailed May 1, 2025, 8 pages.
International Preliminary Report on Patentability for the Application No. PCT/US2023/063894, mailed Sep. 19, 2024, 12 pages.
International Preliminary Reporton Patentability for the Application No. PCT/US2022/82619, mailed on Jul. 11, 2024, 9 pages.
International Search Report and Written Opinion for Application No. PCT/US2022/078130, mailed on Feb. 16, 2023, 11 pages.
International Search Report and Written Opinion for Application No. PCT/US2022/082619, mailed on Jun. 2, 2023, 16 pages.
International Search Report and Written Opinion for Application No. PCT/US2023/035620 mailed on Feb. 15, 2024, 14 pages.
International Search Report and Written Opinion for Application No. PCT/US2023/035623, mailed on Feb. 8, 2024, 10 pages.
International Search Report and Written Opinion for Application No. PCT/US2023/035624, mailed on Feb. 26, 2024, 15 pages.
International Search Report and Written Opinion for Application No. PCT/US2023/035625, mailed on Feb. 26, 2024, 13 pages.
International Search Report and Written Opinion for Application No. PCT/US2023/035627, mailed on Feb. 9, 2024, 13 pages.
International Search Report and Written Opinion for Application No. PCT/US2023/077626, mailed on Feb. 28, 2024, 12 pages.
International Search Report and Written Opinion for Application No. PCT/US2024/017647, mailed on Jun. 6, 2024, 13 pages.
International Search Report and Written Opinion for Application No. PCT/US2024/028423, mailed on Jul. 18, 2024, 13 pages.
International Search Report and Written Opinion for Application No. PCT/US2024/043449, mailed on Nov. 15, 2024, 16 pages.
International Search Report and Written Opinion for Application No. PCT/US2025/011619, mailed on Mar. 27, 2025, 13 Pages.
International Search Report and Written Opinion for the application No. PCT/US2023/063894, mailed on Sep. 29, 2023, 14 pages.
Kim T., et al., "Spatiotemporal Compression for Efficient Storage and Transmission of High-Resolution Electrocorticography Data," Annual International Conference of the IEEE Engineering in Medicine and Biology Society, Aug. 28, 2012, pp. 1012-1015.
Liu X., et al., "An Energy-Efficient Compressed Sensing-Based Encryption Scheme for Wireless Neural Recording," IEEE Journal on Emerging and Selected Topics in Circuits and Systems, Jun. 2021, vol. 11, No. 2, pp. 405-414.
Office Action for Canadian Patent Application No. 3241544, mailed Jul. 25, 2024, 3 pages.
Sorrell E., et al., "Brain-machine Interfaces: Closed-loop Control in an Adaptive System," Annual Review of Control, Robotics, and Autonomous Systems, Jan. 29, 2021, vol. 4, pp. 167-189.
Wang N.X.R., et al., "Unsupervised Decoding of Long-Term, Naturalistic Human Neural Recordings with Automated Video and Audio Annotations," Frontiers in Human Neuroscience, Apr. 21, 2016, vol. 10, No. 165, 13 pages.
Biederman W., et al., "A Fully-Integrated, Miniaturized (0.125 $mm^2$) 10.5 µW Wireless Neural Sensor," IEEE Journal of Solid-state Circuits, 2013, vol. 48, No. 4, pp. 960-970.
Coelho K., et al., "Cryptographic Algorithms in Wearable Communications: An Empirical Analysis," IEEE Communications Letters, 2019, vol. 23, No. 11, pp. 1931-1934.
Examination Report No. 1 for Australian Patent Application No. 2023230897 dated Jun. 26, 2025, 10 pages.
Ghoreishizadeh S.S., et al., "A Lightweight Cryptographic System for Implantable Biosensors," Proceedings of 2014 IEEE Biomedical Circuits and Systems Conference (BioCAS), 2014, pp. 472-475.
Hinterberger T., et al., "Voluntary Brain Regulation and Communication with Electrocorticogram Signals," Epilepsy and Behavior, Aug. 1, 2008, vol. 13, No. 2, pp. 300-306.
International Search Report and Written Opinion for Application No. PCT/US2025/019165, mailed on Jun. 6, 2025, 18 pages.
Kim H., et al., "A Configurable and Low-Power Mixed Signal SoC for Portable ECG Monitoring Applications," IEEE Transactions on Biomedical Circuits and Systems, 2014, vol. 8, No. 2, pp. 257-267.
Schwemmer M.A., et al., "Meeting Brain-Computer Interface User Performance Expectations Using a Deep Neural Network Decoding Framework," Nature Medicine, Sep. 24, 2018, vol. 24, No. 11, pp. 1669-1676.
Yanagisawa T., et al., "Electrocorticographic Control of a Prosthetic Arm in Paralyzed Patients," Annals of Neurology, 2012, vol. 71, No. 3, pp. 353-361.
Ogawa H., et al., "Rapid and Minimum Invasive Functional Brain Mapping by Real-time Visualization of High Gamma Activity During Awake Craniotomy," World Neurosurgery, Nov. 2014, 10 pages.
Pallud J., et al., "Direct Electrical Bipolar Electrostimulation for Functional Cortical and Subcortical Cerebral Mapping in Awake Craniotomy. Practical Considerations," Neurochirurgie, Jun. 1, 2017, vol. 63, pp. 164-174.
Uy J., et al., "Stability of Maps of Human Motor Cortex Made with Transcranial Magnetic Stimulation," Brain Topography, Jun. 2002, vol. 14, No. 4, pp. 293-297.
Matsushita et al., "A Fully Implantable Wireless ECOG 128-Channel Recording Device for Human Brain-Machine Interfaces: W-HERBS", frontiers in Neuroscience, vol. 12, Article 811, pp. 1-11, Jul. 30, 2018.
Tchoe et al., "Human Brain Mapping with Multi-Thousand Channel PtNRGrids Resolves Saptiotemporal Dynamics", Sci Transl Med., vol. 14, No. 628, pp. 1-22, Nov. 11, 2022.
Bridges et al., "MEA Viewer: A high-performance interactive application for visualizing electrophysiological data", PLOS One, pp. 1-10, Feb. 9, 2018.
Beck C., et al., "Block Cipher Based Security for Severely Resource-Constrained Implantable Medical Devices," In Proceedings of the 4th International Symposium on Applied Sciences in Biomedical and Communication Technologies (ISABEL '11) Association for Computing Machinery, Oct. 26, 2011, No. 62, pp. 1-5.
DAEMEN J., et al., "AES Proposal: Rijndael," National Institute of Standards and Technology, 1999, 47 pages.
Judy M., et al., "A Nonlinear Signal-Specific ADC for Efficient Neural Recording," Biomedical Circuits and Systems Conference (BioCAS), 2010, pp. 17-20.
Kester Q.A., "A Cryptographic Image Encryption Technique for Facial-Blurring of Images," International Journal of Advanced Technology & Engineering Research, May 2013, vol. 3, No. 3, pp. 1-7.

(56) References Cited

OTHER PUBLICATIONS

Maji S., et al., "A Low-power Dual-Factor Authentication Unit for Secure Implantable Devices" IEEE Custom Integrated Circuits Conference (CICC), 2020, 10 pages, Retrieved from the Internet URL: https://arxiv.org/pdf/2004.13709.

Schneier B., "Description of a New Variable-Length Key, 64-Bit Block Cipher (Blowfish)," Fast Software Encryption, Cambridge Security Workshop Proceedings, Dec. 1993, pp. 191-204.

Third Party Prior Art Submission for U.S. Appl. No. 18/180,248, filed on Aug. 12, 2025.

Thorpe C., et al., "A Coprime Blur Scheme for Data Security in Video Surveillance," In IEEE Transactions on Pattern Analysis and Machine Intelligence, 2013, vol. 35, No. 12, pp. 3066-3072.

Rohaut B., et al., "Uncovering Consciousness in Unresponsive ICU Patients: Technical, Medical and Ethical Considerations," Critical Care, Mar. 9, 2019, vol. 23, No. 78, 9 pages, doi:10.1186/s13054-019-2370-4.

"What are polymides?", UBE Corporation, accessed on Sep. 19, 2025, accessed at https://www.ube.com/ube/en/contents/chemical/ploymide/ploymide_column.html (Year: 2025).

Escabi M.A., et al., "A high-density, high-channel count, multiplexed muECoG array for auditory-cortex recordings" Journal of Neurophysiology, 2014, vol. 112, No. 6, pp. 1566-1583.

Office Action for Canadian Patent Application No. 3,245,576, mailed Oct. 14, 2025, 5 pages.

\* cited by examiner

NEURAL FOUNDATION MODELS FOR BRAIN-COMPUTER INTERFACE

BACKGROUND

Brain-computer interfaces (BCIs) have shown promise as systems for restoring, replacing, and augmenting lost or impaired neurological function in a variety of contexts, including paralysis from stroke and spinal cord injury, blindness, and some forms of cognitive impairment. Multiple innovations over the past several decades have contributed to the potential of these neural interfaces, including advances in the areas of applied neuroscience and multi-channel electrophysiology, mathematical and computational approaches to neural decoding, power-efficient custom electronics and the development of application-specific integrated circuits, as well as materials science and device packaging. Nevertheless, the practical impact of such systems remains limited, with only a small number of subjects worldwide having received highly customized interfaces through clinical trials.

High bandwidth brain-computer interfaces are being developed to enable the bidirectional communication between the nervous system and external computer systems in order to assist, augment, or replace neurological function lost to disease or injury. A brain-computer interface should be able to accurately decode electrophysiologic signals recorded from individual neurons, or populations of neurons, and correlate such activity with one or more sensory stimuli or intended motor response. For example, such a system may record activity from the primary motor cortex in an animal or a paralyzed human subject and attempt to predict the actual or intended movement in a specific body part.

Prior attempts to utilize brain-computer interfaces for speech decoding have been limited due to the low signal-to-noise ratio (SNR) and the low resolution of the recorded neural signals. Prior attempts have required guessing which signal to follow from noisy data prior to trying to decode the signal. Due to these limitations, decoding speech based on neural recordings captured using neural interfaces has been extremely challenging.

SUMMARY

The present disclosure is directed to systems and methods for utilizing neural foundation models (NFMs) to facilitate communication using brain-computer interfaces. NFMs are a category of deep learning models that have been trained on recordings captured from a BCI device across a variety of tasks, users, and sessions. NFMs captures both a low and high-level representation of the brain recordings which we have called neural embeddings. Neural embeddings can be adopted for several BCI use cases across subjects through fine-tuning a smaller model using only a few examples making them more data efficient and generalizable.

The present disclosure is directed to a method comprising: receiving recorded brain signals via a microelectrode array, the microelectrode array comprising non-penetrating cortical surface microelectrodes; extracting spatiotemporal features from the recorded brain signals; transforming, using a neural foundation model, the spatiotemporal features to generate one or more transformed feature embeddings, wherein the neural foundation model has been trained to associate spatiotemporal features from brain signals with at least one of speech or motor tasks; and predicting speech or motor tasks based on the one or more transformed feature embeddings.

In some embodiments, the neural foundation model has been trained to associate spatiotemporal features from brain signals with a plurality of tasks.

In some embodiments, the neural foundation model comprises an encoder, and the method further comprises: receiving one or more subject-specific embeddings at the encoder; transforming, by the encoder, the one or more subject-specific embeddings; and applying a weighted sum based on the transformed feature embeddings and the transformed subject-specific embeddings.

In some embodiments, the weighted sum outputs an encoded representation of the transformed feature embeddings and the subject-specific embeddings, and the method further comprises: concatenating the encoded representation of the transformed feature embeddings and the subject-specific embeddings with a user embedding representing a profile of the user.

In some embodiments, the recorded brain signals comprise a plurality of frames ordered temporally in a three-dimensional array, the frames comprising recorded brain signals at different time steps, and the method further comprises: dividing the plurality of frames into a plurality of patches; wherein the spatiotemporal features are extracted from the plurality of patches.

In some embodiments, the neural foundation model comprises an encoder, and the method further comprises: tuning the encoder by freezing one or more parameters of the encoder and training one or more layers of the encoder.

In some embodiments, predicting speech comprises: aligning, by a beam search decoder, predicted phonemes based on one or more language constraints; and generating a predicted transcription based on the aligning.

The present disclosure is directed to a system comprising: a microelectrode array comprising non-penetrating cortical surface microelectrodes; and a computer system communicably coupled to the microelectrode array, the computer system comprising: a processor; and a memory coupled to the processor, the memory storing instructions that, when executed by the processor, cause the computer system to: receive recorded brain signals via the microelectrode array, the microelectrode array comprising non-penetrating cortical surface microelectrodes; extract spatiotemporal features from the recorded brain signals; transform, using a neural foundation model, the spatiotemporal features to generate one or more transformed feature embeddings, wherein the neural foundation model has been trained to associate spatiotemporal features from brain signals with at least one of speech or motor tasks; and predict speech or motor tasks based on the one or more transformed feature embeddings.

The present disclosure is directed to a computer system communicably connected to a microelectrode array comprising non-penetrating cortical surface microelectrodes, the computer system comprising: a processor; and a memory coupled to the processor, the memory storing instructions that, when executed by the processor, cause the computer system to: receive recorded brain signals via the microelectrode array, the microelectrode array comprising non-penetrating cortical surface microelectrodes; extract spatiotemporal features from the recorded brain signals; transform, using a neural foundation model, the spatiotemporal features to generate one or more transformed feature embeddings, wherein the neural foundation model has been trained to associate spatiotemporal features from brain signals with at least one of speech or motor tasks; and predict speech or motor tasks based on the one or more transformed feature embeddings.

In some embodiments, the neural foundation model has been trained to associate spatiotemporal features from brain signals with a plurality of tasks.

In some embodiments, the neural foundation model comprises an encoder; and the memory stores further instructions that, when executed by the processor, cause the computer system to: receive one or more subject-specific embeddings at the encoder, transform, by the encoder, the one or more subject-specific embeddings, and apply a weighted sum based on the transformed feature embeddings and the transformed subject-specific embeddings.

In some embodiments, the weighted sum outputs an encoded representation of the transformed feature embeddings and the subject-specific embeddings; and the memory stores further instructions that, when executed by the processor, cause the computer system to: concatenate the encoded representation of the transformed feature embeddings and the subject-specific embeddings with a user embedding representing a profile of the user.

In some embodiments, the recorded brain signals comprise a plurality of frames ordered temporally in a three-dimensional array, the frames comprising recorded brain signals at different time steps; and the memory stores further instructions that, when executed by the processor, cause the computer system to: divide the plurality of frames into a plurality of patches, wherein the one or more features are extracted from the plurality of patches.

In some embodiments, the neural foundation model comprises an encoder; and the memory stores further instructions that, when executed by the processor, cause the computer system to: tune the encoder by freezing one or more parameters of the encoder and training one or more layers of the encoder.

In some embodiments, the memory stores further instructions that, when executed by the processor, cause the computer system to predicting speech by: aligning, by a beam search decoder, predicted phonemes based on one or more language constraints; and generating a predicted transcription based on the aligning.

FIGURES

DETAILED DESCRIPTION

The present disclosure is generally directed to systems and methods for enabling people who cannot speak to communicate. In particular, the present disclosure is directed to using a NFM to decode speech based on brain signals recorded via a brain-computer interface.

Disclosed herein are a system and methods for decoding speech from brain signals utilizing NFMs. In conventional BCI systems, translating brain signals to intuitive communications is hindered by variability in array placement (array refers to electrodes responsible for capturing brain signals), variability in brain signals, low SNR, and subject-specific differences due to the anatomy of the brain, age, underlying conditions, gender, etc. Through harnessing the computational and linguistic capabilities of NFMs, BCIs can decode and generate natural language from brain signals in real-time, thereby facilitating seamless bidirectional communication between a subject and other individuals. Further, BCIs can decode multiple tasks using NFMs, including generating speech and video from brain signals in real-time based on multi-task learning. Multi-task learning is a set of techniques wherein one machine learning model learns to decode multiple tasks similar to how human brain works.

Neural Device Systems

Conventional BCI/neural devices typically include electrode arrays that penetrate a subject's brain to sense and/or stimulate the brain. However, the present disclosure is directed to the use of non-penetrating BCI devices, i.e., BCI devices having electrode arrays that do not penetrate the cortical surface. Such non-penetrating BCI devices are minimally invasive and minimize the amount of impact on the subject's cortical tissue. BCI devices can sense and record brain activity, receive instructions for stimulating the subject's brain, and otherwise interact with a subject's brain as generally described herein.

Figure 1:
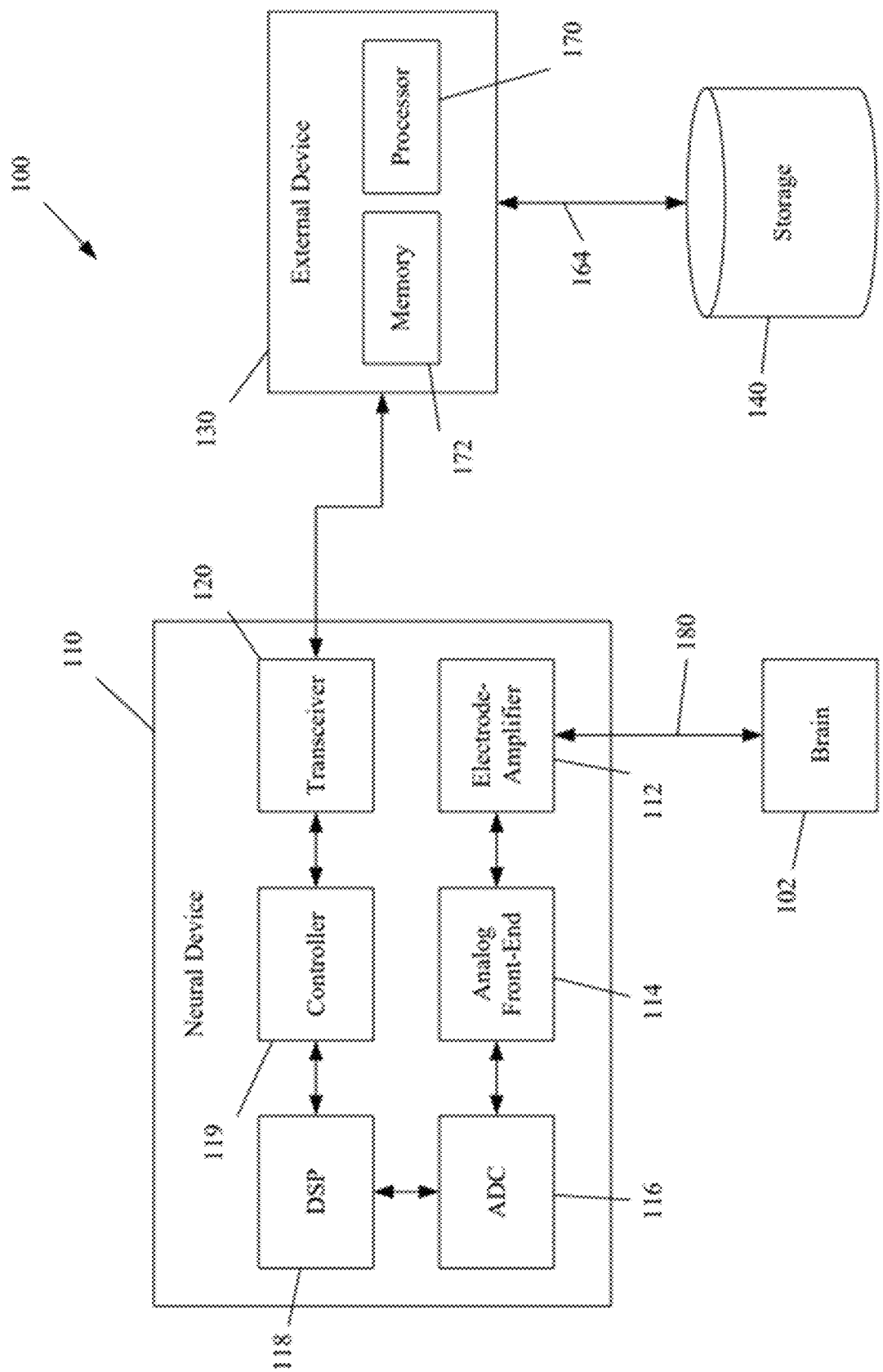
FIG. 1 depicts a block diagram of a secure neural device data transfer system, in accordance with illustrative embodiments.
Figure 2:
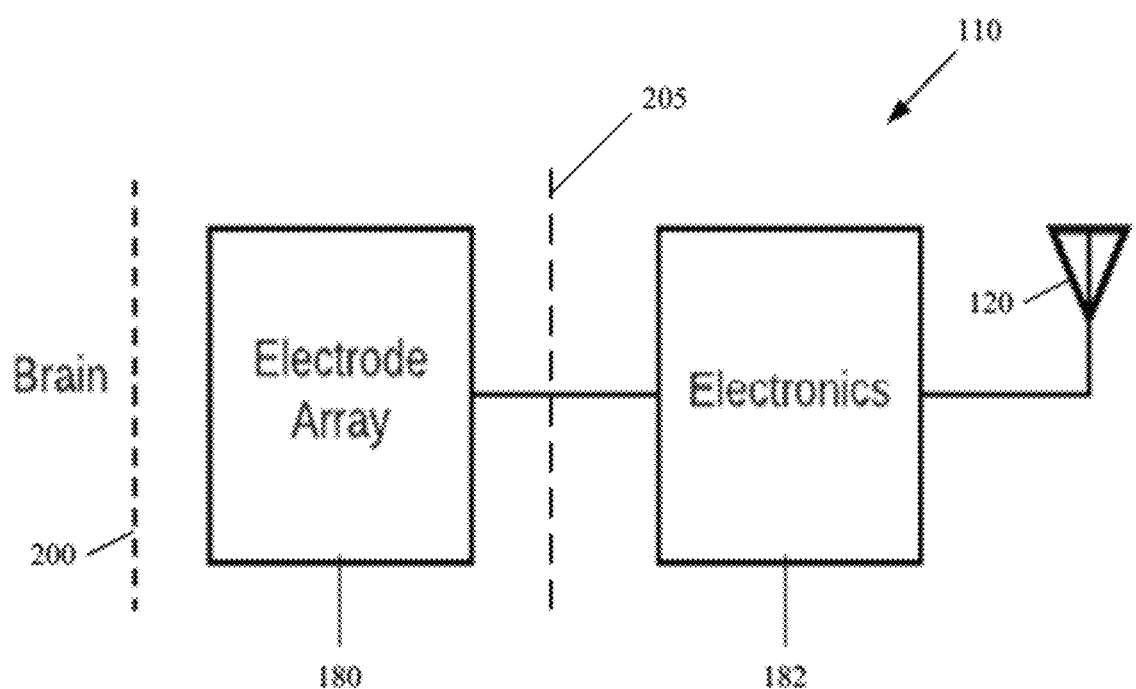
FIG. 2 depicts a diagram of a neural device, in accordance with illustrative embodiments.
Figure 3:
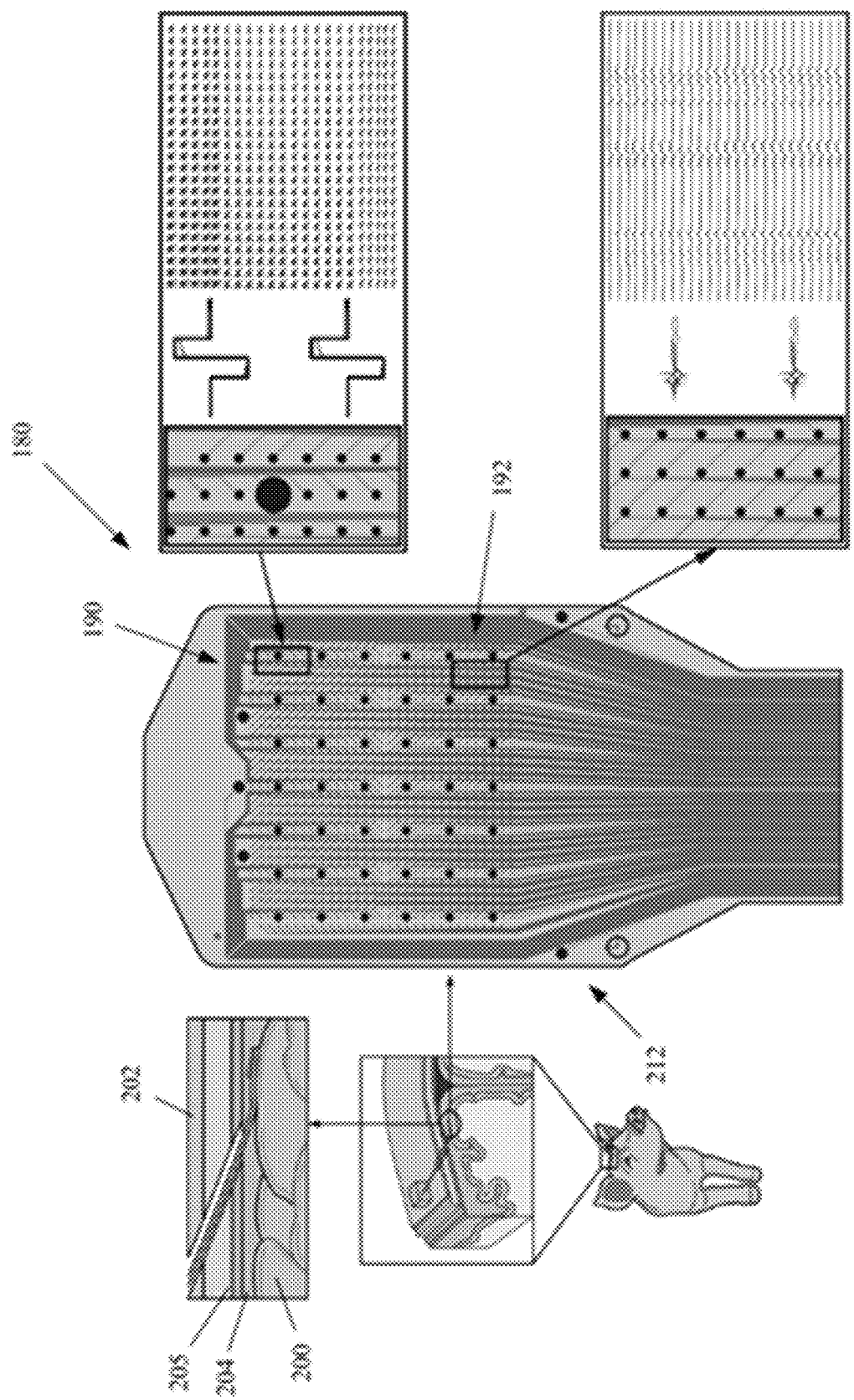
FIG. 3 depicts a diagram of a thin-film, microelectrode array neural device and implantation method, in accordance with illustrative embodiments.

Referring now to FIGS. 1-3, there is shown a diagram of an illustrative system 100 including a neural device 110 that is communicatively coupled to an external device 130. The external device 130 can include any device to which the neural device 110 can be communicatively coupled, such as a computer system or mobile device (e.g., a tablet, a smartphone, a laptop, a desktop, a secure server, a smartwatch, a head-mounted virtual reality device, a head-mounted augmented reality device, or a smart inductive charger device). The external device 130 can include a processor 170 and a memory 172. In some embodiments, the external device 130 can include a server or a cloud-based computing system. In some embodiments, the external device 130 can further include or be communicatively coupled to storage 140. In one embodiment, the storage 140 can include a database stored on the external device 130. In another embodiment, the storage 140 can include a cloud computing system (e.g., Amazon Web Services or Azure).

In some embodiments, the electrode array 180 of the neural device 110 can have electrodes that are sufficiently small and spaced at sufficiently small distances in order to define a high-density electrode array 180 that can, accordingly, capture high resolution electrocortical data. Such high-resolution data can be used to resolve electrographic features that can otherwise not be identified using lower resolution electrode arrays. In some embodiments, the electrodes of the electrode array 180 can be from about 10 μm to about 500 μm in width. In one illustrative embodiment, the electrodes of the electrode array 180 can be about 50 μm in width. In some embodiments, the electrodes of the electrode array 180 can be spaced by about 200 μm (i.e., 0.2 mm) to about 3,000 μm (i.e., 3 mm). In illustrative one embodiment, adjacent electrodes of the electrode array 180 can be spaced by about 400 μm.

The neural device 110 can further include a flexible substrate 212 supporting the electrode array 180 and/or other components of the neural device 110, as shown in FIG. 3. In some embodiments, the flexible substrate 212 can be flexible enough to permit the electrode array 180 to be inserted through an osteotomy into the subdural space 204, then along the cortical surface.

The neural device 110 can include a range of electrical or electronic components. In the illustrated embodiment, the neural device 110 includes an electrode-amplifier stage 112, an analog front-end stage 114, an analog-to-digital converter (ADC) stage 116, a digital signal processing (DSP) stage 118, and a transceiver stage 120 that are communicatively coupled together. The electrode-amplifier stage 112 can include an electrode array 180, such as is described below, that is able to physically interface with the brain 102 of the subject in order to sense brain signals and/or apply electrical signals thereto. The analog front-end stage 114 can be configured, amplify signals that are sensed from or applied to the brain 102, perform conditioning of the sensed or applied analog signals, perform analog filtering, and so on. The front-end stage 114 can include, for example, one or more application-specific integrated circuits (ASICs) or other electronics. The ADC stage 116 can be configured to convert received analog signals to digital signals. The DSP stage 118 can be configured to perform various DSP techniques, including multiplexing of digital signals received via the electrode-amplifier stage 112 and/or from the external device 130. For example, the DSP stage 118 can be configured to convert instructions from the external device 130 to a corresponding digital signal. The transceiver stage 120 can be configured to transfer data from the neural device 110 to the external device 130 located outside of the body of the subject.

In some embodiments, the neural device 110 can include a controller 119 that is configured to perform various functions, including compressing electrophysiologic data generated by the electrode array 180. In various embodiments, the controller 119 can include hardware, software, firmware, or various combinations thereof that are operable to execute the functions described below. In one embodiment, the controller 119 can include a processor (e.g., a microprocessor) executing instructions stored in a memory. In another embodiment, the controller 119 can include a field-programmable gate array (FPGA) or application-specific integrated circuit (ASIC).

In various embodiments, the stages of the neural device 110 can provide unidirectional or bidirectional communications (as indicated in FIG. 1) by and between the neural device 110 and the external device 130. In various embodiments, one or more of the stages can operate in a serial or parallel manner with other stages of the system 100. It can further be noted that the depicted architecture for the system 100 is simply intended for illustrative purposes and that the system 100 can be arranged differently (i.e., components or stages can be connected in different manners) or include additional components or stages.

In some embodiments, the neural device 110 described above can include a brain implant, such as is shown in FIG. 2. The neural device 110 can be a biomedical device configured to study, investigate, diagnose, treat, and/or augment brain activity. In some embodiments, the neural device 110 can be positioned between the brain 200 and the scalp 202 or between the brain and the dura 205 in the subdural space 204, as shown in FIG. 3. In some embodiments, the neural device 110 can be positioned between the brain 200 and the dura 205. The neural device 110 can include an electrode array 180 (which can be a component of or coupled to the electrode-amplifier stage 112 described above) that is configured to record and/or stimulate an area of the brain 200. The electrode array 180 can be connected to an electronics hub 182 (which can include one or more of the electrode-amplifier stage 112, analog front-end stage 114, ADC stage 116, and DSP stage 118) that is configured to transmit via wireless or wired transceiver 120 to the external device 130 (in some cases, referred to as a "receiver").

The electrode array 180 can include non-penetrating cortical surface microelectrodes (i.e., the electrode array 180 does not penetrate the brain 200). Accordingly, the neural device 110 can provide a high spatial resolution, with minimal invasiveness and improved signal quality. The minimal invasiveness of the electrode array 180 is beneficial because it allows the neural device 110 to be used with larger population of subjects than conventional brain implants, thereby expanding the application of the neural device 110 and allowing more individuals to benefit from brain-computer interface technologies. Furthermore, the surgical procedures for implanting the neural devices 110 are minimally invasive, reversible, and avoid damaging neural tissue. In some embodiments, the electrode array 180 can be a high-density microelectrode array that provides smaller features and improved spatial resolution relative to conventional neural implants.

In some embodiments, the neural device 110 includes an electrode array configured to stimulate or record from neural tissue adjacent to the electrode array, and an integrated circuit in electrical communication with the electrode array, the integrated circuit having an analog-to-digital converter (ADC) producing digitized electrical signal output. In some embodiments, the ADC or other electronic components of the neural device 110 can include an encryption module, such as is described below. The neural device 110 can also include a wireless transmitter (e.g., the transceiver 120) communicatively coupled to the integrated circuit or the encryption module and an external device 130. The neural device 110 can also include, for example, control logic for operating the integrated circuit or electrode array 180, memory for storing recordings from the electrode array, and a power management unit for providing power to the integrated circuit or electrode array 180.

Referring now to FIG. 3, there is shown a diagram of an illustrative embodiment of a neural device 110. In this embodiment, the neural device 110 comprises an electrode array 180 comprising nonpenetrating microelectrodes. As generally described above, the neural device 110 is configured for minimally invasive subdural implantation using a cranial micro-slit technique, i.e., is inserted into the subdural space 204 between the dura 205 and the surface of the subject's brain 200. In some embodiments, the neural device 110 is inserted into the subdural space 204 between the dura 205 and the surface of the brain 200. Further, the microelectrodes of the electrode array 180 can be arranged in a variety of different configurations and can vary in size. In this particular example, the electrode array 180 includes a first group 190 of electrodes (e.g., 200 µm microelectrodes) and a second group 192 of electrodes (e.g., 20 µm microelectrodes). Further, example stimulation waveforms in connection with the first group 190 of electrodes and the resulting post-stimulus activity recorded over the entire array is depicted for illustrative purposes. Still further, example traces from recorded neural activity recorded by the second group 192 of electrodes are likewise illustrated. In this example, the electrode array 180 provides multichannel data that can be used in a variety of electrophysiologic paradigms to perform neural recording of both spontaneous and stimulus-evoked neural activity as well as decoding and focal stimulation of neural activity across a variety of functional brain regions.

Additional information regarding brain-computer interfaces described herein can be found in Ho et al., *The Layer 7 Cortical Interface: A Scalable and Minimally Invasive Brain—Computer Interface Platform*, bioRxiv 2022.01.02.474656; doi: https://doi.org/10.1101/2022.01.02.474656, which is hereby incorporated by reference herein in its entirety.

Neural Foundation Models for Decoding Speech

As generally described above, BCIs can be useful for a variety of different applications for restoring, replacing, and/or augmenting lost or impaired neurological function. However, conventional BCIs have challenges related to speed, accuracy, and the feasibility of the use of the communication channels. Conventional BCI systems translate brain signals typically captured from electroencephalography (EEG) or electrocorticography (ECoG) into a predetermined set of commands to enable a form of limited communication. Such conventional BCI system are based on EEG/ECoG data captured from test subjects that has been translated into the aforementioned commands; however, such techniques are limited because they rely on signal processing and neurophysiological signals that are ultimately derived from a small number of subjects. Translating brain signals from new subjects based on such pre-characterized data is hindered by variability in neural array placements between different subjects, the inherent variability in brain signals, low SNR ratio, and user-specific differences (e.g., differences in subjects' brain anatomy), which in turn leads to the issues with speed, accuracy, and the feasibility of the communication channels.

In order to address these issues with conventional BCI systems, embodiments of systems are described herein that incorporate NFMs with large language models (LLMs). The integration of NFMs with BCI system can be used to address the limitations of conventional BCI systems to enable a more intuitive, efficient, and natural form communication between users and computer systems. Through harnessing the computational and linguistic capabilities of NFMs, a BCI system can decode and generate neutral language from brain signals in real-time, thereby facilitating seamless bidirectional communication. Further, techniques for incorporating NFMs with a BCI system to improve the performance of the BCI system are described herein. For example, techniques for incorporating NFMs into a BCI system for engineering relevant features that improve the decoding of speech and movements from brain recordings are described herein.

In some embodiments, a BCI system (e.g., system 100) can include a neural device 110 that is communicatively coupled to a client device (e.g., external device 130). The neural device 110 can be used to capture electrocortical data that is translated into text and/or speech for facilitating communication via the client device. The client device can, for example, be a desktop computer equipped with applications configured to record and analyze signals. The client device can execute various NFMs and/or other algorithms to decode speech from the signals. The client device can be equipped with one or more modules configured to execute the NFMs and/or other algorithms.

Figure 4A:
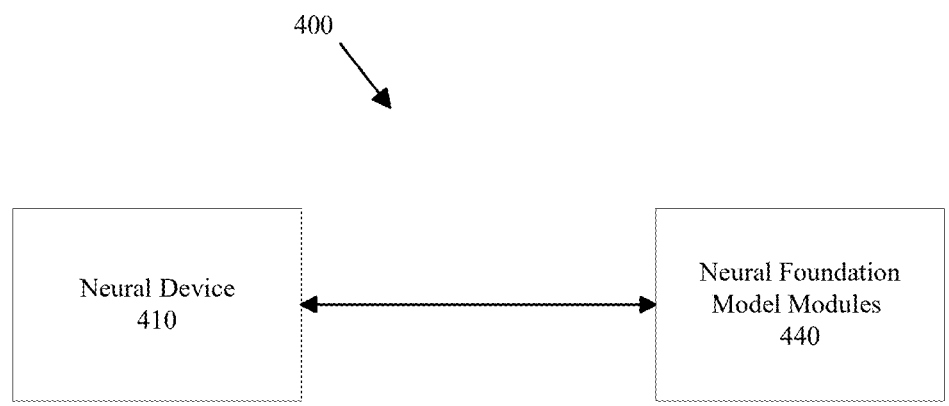
FIG. 4A depicts a generalized illustrative computing environment, in accordance with illustrative embodiments.

FIG. 4A is a block diagram illustrating a general illustrative computing environment 400 for decoding speech from brain signals captured by a BCI, according to example embodiments. The neural device 410 can be connected to one or more NFM modules 440. As used herein, the term "module" refers to hardware, software, firmware, or various combinations thereof that are operable to execute the described functions. The NFM software modules 440 can be stored on at least one of a local area network, an external network, a computing system (e.g., a tablet, a smartphone, a laptop, a desktop, a secure server, a smartwatch, a head-mounted virtual reality device, a head-mounted augmented reality device, or a smart inductive charger device), and a cloud computing network. In one embodiment, the one or more NFM modules 440 can be executed onboard the neural device 110. In another embodiment, the one or more NFM modules 440 can be executed by the external device 130. In yet another embodiment, the one or more NFM modules 440 can be executed across the neural device 110, the external device 130, and/or other devices in a parallel or sequential manner. In some embodiments, the computing environment 400 is capable of bidirectional communication between the neural interface 410 and the NFM modules 440. In some embodiments, the NFM modules 440 can include one or more LLMs.

Figure 4B:
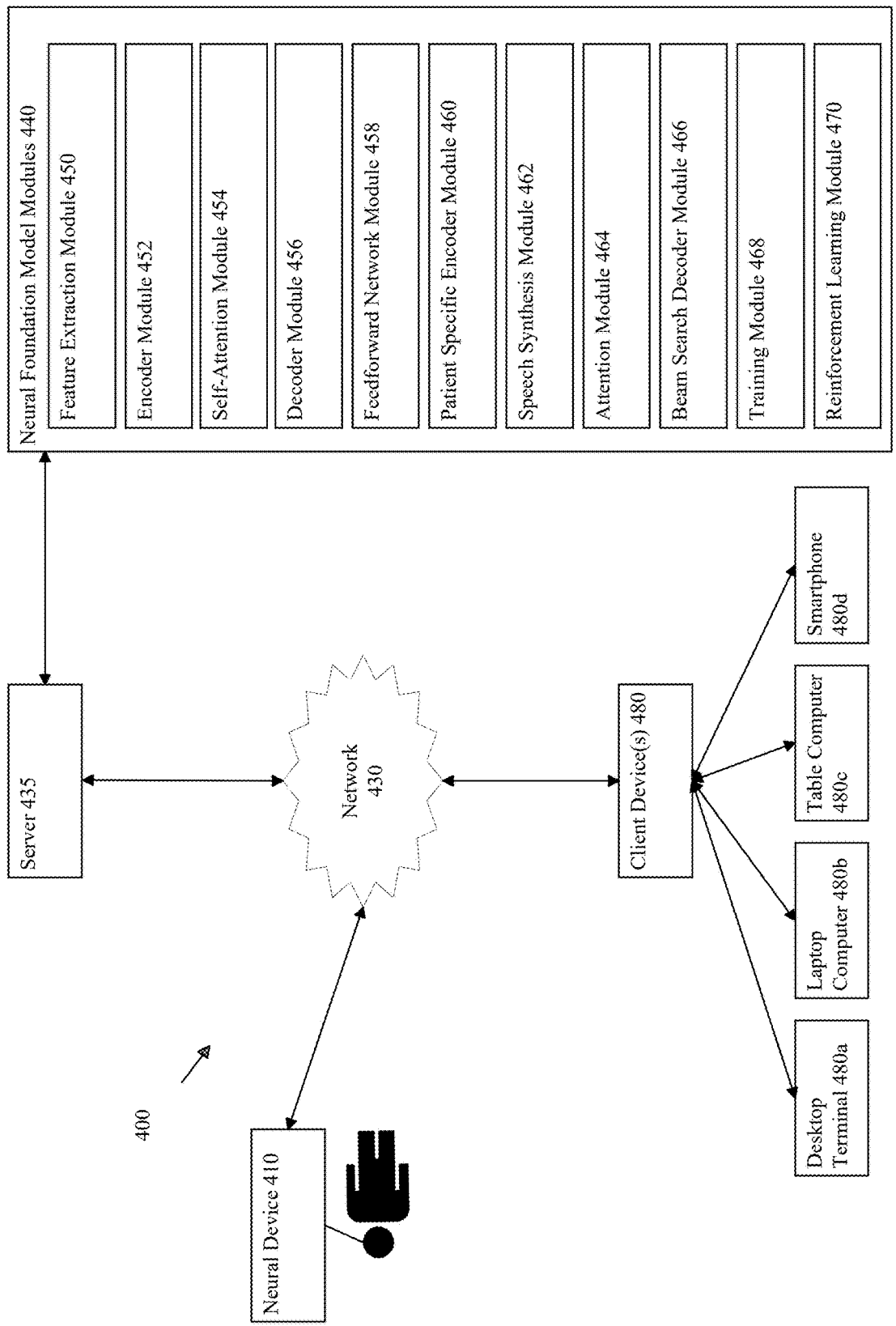
FIG. 4B depicts an illustrative computing environment, in accordance with illustrative embodiments.

FIG. 4B is a block diagram illustrating an illustrative computing environment 400 for decoding speech from brain signals captured by a BCI, according to example embodiments. As shown, the computing environment 40 can be based on a client-server model, with a server 435 connected to at least one client device 480. The computing environment 400 can include a neural interface 410 communicatively coupled to a server 435. In some embodiments, the neural interface 410 can be considered a client to the server 435. It should, however, be understood that the client-server model is just for illustration and ease of explanation and should not be considered limiting. Therefore, any type of computing environment performing the functionality disclosed herein should be considered within the scope of this disclosure. Furthermore, the individual components of the computing environment 400 are just illustrative and computing environments with alternative, additional, or fewer number of components should be considered within the scope of this disclosure.

The computing environment 400 can be generally in a clinical setting to monitor brain signals of a subject. In some illustrative use cases, the server 435 can store different NFM modules 440 that can be accessed by the clients 480 and neural interface 410 using the network 430. The clients 480 themselves can have standalone applications (not shown) to access the NFM modules 440. Alternatively, the clients 480 can access the NFM modules 440 through a browser application, for example. Similarly, the neural interface 410 can access the NFM modules 440 through any type of firmware and/or software installed in the neural interface 410. In some embodiments, the neural interface 410 can communicate with the server 435 using one or more of the clients 480.

The hardware of the server 435 storing the NFM modules 440 can include any kind of computing device. For example, the server 435 can include a server computer, a desktop computer, a laptop computer, a tablet computer, a smartphone. The server 435 may not necessarily be at a single location and can be realized by a network of computers. Furthermore, the server 435 may not necessarily be co-located within the clinical setting itself and can be hosted by a third-party cloud computing provider. Therefore, any kind of server 435 should be considered within the scope of this disclosure.

As described above, the clients 480 and/or the neural interface 410 can access the server 435 through the network 430. The network 430 can include any combination of one or more packet switching networks (e.g., an internet protocol-based network) and/or one or more circuit switching networks (e.g., a cellular telephony network). Some non-limiting examples of the network 430 include a local area network, a metropolitan area network, and/or a wide area network such as the Internet, etc. Similarly, non-limiting examples of the clients 480 can include a desktop terminal (e.g., desktop terminal 480*a*), a laptop computer (e.g., a laptop computer 480*b*), a tablet computer (e.g., a tablet computer 480*c*), a smartphone (e.g., a smartphone 480*d*), etc. Any type of computing device that allows an access to the server 435 through the network 430 should be considered within the scope of this disclosure. Furthermore, the functionality described within this disclosure can be distributed in any fashion, i.e., functionality of the server 435 can be performed by one or more clients 480 and vice versa.

As described above, the server 435 can include multiple software modules. FIG. 4B shows some non-limiting illustrative software modules: a feature extraction module 450, an encoder module 452, a self-attention module 454, a decoder module 456, a feedforward network module 458, a subject-specific encoder module 460, a speech synthesis module 462, an attention module 464, a beam search decoder module 466, a training module 468, and a reinforcement learning module 470. It should be understood that this described modularization of the server 435 functionality is provided simply for the ease of explanation and should not be considered limiting. Therefore, any kind of alternative modularization should be considered within the scope of this disclosure.

The feature extraction module 450 can extract features of the brain signals from the recorded brain signals captured by the neural interface 410. In some embodiments, the extracted features include a spatial representation and a temporal representation of the recorded brain signals. The neural device represented in this patent includes 1024 electrodes in a 33 by 31 shape (where one electrode is dropped out after reshaping) which can be employed to extract spatial information across electrodes. The feature extraction module 450 can select features of the recorded brain signals using convolutional neural network models or through analysis of different frequency bands e.g., one feature may contain high frequency signals that correlates with the intent to moving the hands or uttering vowels. The neural interface 410 can be a high-resolution BCI which provides a high-resolution brain signal with decreased SNR. In some embodiments, the neural interface 410 can include the neural device 180 described above. In some embodiments, user profile data and/or digital history can be concatenated with the feature extraction module 450.

The encoder module 452 can generate embeddings based on the feature representations generated by the feature extraction module 450. For example, if the recorded brain signals are separated into patches (i.e., a group of neighboring electrodes) 502 and frames 501, the encoder module 452 can capture spatial relationships between the patches 502 in the frames 501 as well as temporal relationships between frames 501. The encoder module 452 can include one or more self-attention modules 454 and/or a feedforward network modules 458*e*. Wherein the self-attention module is a mechanism that allows the model to learn which patches and frames are most important for a given decoding task. For example, the one or more self-attention modules 454 can learn both the spatial representation between patches 502 and the temporal representation between frames 501. The encoder module 452 can be tailored to speech production and can include at least one temporal transformer block and at least one spatial transformer block. These transformer blocks can include self-attention modules 454 and can separate the spatial representation and the temporal representation from the spatiotemporal features. The separate spatial and temporal representations can be used to determine speech, as a spatial representation, in addition to the temporal representation, is needed to decode speech. This is in contrast to text being able to be decoded based on a temporal representation.

In some embodiments, encoder module 452 can be trained using multitask learning. Multitask learning can create a robust encoder module 452 by learning to generalize its understanding of data to multiple tasks. As such, encoder module 452 can be used in inference using zero-shot and/or few-shot classification. Encoder module 452 can generalize across tasks and subjects such that for a given dataset, encoder module 452 can extract representations consistent with the appropriate task. For example, for neural data representing a subject's attempt to move, encoder module 452 can extract the representations consistent with movement and determine that a particular motion is attempted. The representation can be based on a k-nearest neighbor determination. For example, if encoder module 452 generates a neural embedding from a movement by a subject, then the k-nearest neighbor can determine if it is near a certain pre-determined class of movements.

The self-attention module 454 can be used by at least one of the other NFM modules 440 to weigh the importance of elements in an input and adjust their influence on the output. The importance of each element can determine how much attention is paid to it. The elements can include past events which can enable long-term dependencies. For example, the encoder module 452 can use the self-attention modules 454 to incorporate past elements that can be beneficial to the prediction.

The decoder module 456 can receive the output from the encoder module 452 to decode the spatial and temporal embeddings generated by the encoder module 452. In some embodiments, the decoder module 456 can include a causal masked attention module 464 wherein masking control which sequence can see each other in the attention computation. A causal mask ensures that the model can only attend to tokens at the current or earlier positions, not future positions. The decoder module 456 can be used to predict phonemes based on the spatial and temporal embeddings received from the encoder module 452 and/or the feedforward network module 458.

The feedforward network module 458 can include an efficient model comprising a reduced number of parameters to reduce training time for personalization of a model for a subject. For example, during personalization the number of trainable parameters can be reduced from w*h to w*r+h*r, where w is the number of layers of the feedforward network module, h is number of units in each layer, and rank r is a value greater than one determined through hyperparameter tuning. The reduced feedforward network parameter is then weighted average with the original feedforward network, i.e., w*h+alpha*(w*r+h*r) where alpha controls the weighting between the two networks. In some embodiments, the reduced feedforward network module 458 can enable the training module 468 to efficiently fine-tune the feedforward network module 458 at least once per day.

The subject-specific encoder module 460 can learn from subject-specific representations based on data gathered for the specific subject while keeping the rest of the model frozen. The subject-specific encoder module 460 can be fine-tuned regularly to ensure that the subject-specific encoder module 460 is properly encoding the recorded brain signals. In some embodiments, the encoder module 452 can include a subject-specific encoder module 460. The output of the subject-specific encoder module 460 can be weighted summed with the output of the feedforward network module 458 to generate a single output embedding of the recorded brain signals. For example, the weighted sum can be represented by the following equation: $w_1$*feedforward network module+$w_2$*subject specific encoder module, where $w_1$ and $w_2$ are relative weightings.

The speech synthesis module 462 can utilize a subject's past speech utterances and corresponding transcription to model the subject's voice characteristics. The speech synthesis module 462 can receive the output from the decoder module 456 and, based on the decoding and predicted speech, generate speech for the subject such that others can hear what the subject wanted to say. In some embodiments, the speech synthesis module 462 can utilize a subject's past video recordings to generate a video representation of the subject. The video representation of the subject can be based on predicted motor commands based on the recorded brain signals. In some embodiments, the beam search decoder module 466 can also predict motor commands.

In some embodiments, the speech synthesis module 462 can generate speech based on the neural embeddings. Speech synthesis module 462 can receive the neural embeddings from encoder module 452 and perform stable diffusion on the neural embedding and a latent time-frequency representation of underlying speech to generate new speech. In some embodiments, speech synthesis module 462 can guide the speech and/or video generation by using Contrastive Language-Image Pre-training (CLIP) loss. Speech synthesis module 462 can generate avatar movement based on neural embeddings of movement and video embeddings of a subject's prior recorded movements.

The attention module 464 can be utilized by the encoder module 452 and the decoder module 456 to attend to selected input elements. The attention module 464 can include at least one transformer block. In some embodiments, attention module 464 can include specialized transformer blocks. For example, attention module 464 can include a spatial transformer block and a temporal transformer block.

The training module 468 can train portions of the NFM. The training module 468 can train at least one of the analytical modules in the NFM modules 440 with a plurality of subjects. In some embodiments, the training module 468 can train the decoder module 456 using a transcription corresponding to the speech segment as a ground truth with a Connectionist Temporal Classification (CTC) loss. The speech transcription corresponds to phonemes which is a distinct units of sound uttered in the speech. The CTC loss aligns the predicted phoneme probabilities using a blank token with the ground truth phoneme transcriptions by automatically aligning them hence reducing the need for detecting and aligning every single phoneme in the neural data. For example, this can be done by instructing a subject what to say prior to recording the brain signals. In some embodiments, the training module 468 can train the encoder module 452 and the decoder module 456.

The decoder module predicts the phoneme probabilities associated with each time step. The beam search module 466 can convert the phoneme probabilities predicted by the decoder module 456 into a transcription. The beam search decoder takes in the phonemes predicted at each time step and evaluates multiple paths (i.e., beam width) to the most likely sequence of phonemes using a language model. The language model is trained on a corpus of text data tokenized to phonemes wherein its tasked to predicting the next phoneme given previous phonemes. In some embodiments, the beam search decoder module 466 can include a CTC beam search decoder. The CTC aligns the phoneme probabilities using a blank token by collapsing repeated phonemes. For example, if the decoder predicted "hellllooo", then the CTC would collapse the repeated phonemes to "hello". The beam search decoder module 466 can additionally predict motor commands based on decoded brain signals by incorporating possible kinematics at each time step.

In some embodiments, the language model is trained using masked language modelling wherein a portions of phonemes are randomly removed and prompting the language model to predict the removed phonemes. This enables the language model to be contextually aware when predicting the most likely phoneme. In some embodiments, the training module 468 can train the speech synthesis module 462 to generate speech that sounds like the user. In some embodiments, the training module 468 can include a reinforcement learning module 470.

The training module 468 can perform fine-tuning to ensure that the NFM is performing as expected. Given the high-resolution data and the costs associated with the training, the training module 468 can freeze one or more layers and/or parameters prior to performing the fine-tuning. In some embodiments, the training module 468 can train at least one of the feedforward network module 458 and the encoder module 452 during the fine-tuning. During fine-tuning, the training module 468 can train the encoder module 452 on a downstream task to enable the NFM to learn a higher-level structure of brain recordings while freezing the decoder module 456. This training can enable neural representations that learn contextual flow and coherence of language. The encoder module 452 can be fine-tuned on a plurality of subjects through gradual unfreezing of layers. In some embodiments, the training module 468 can fine-tune a reduced feedforward network module 458. The training module 468 training a smaller set of parameters enables fine-tuning with a smaller number of samples. The encoder module 452 can also be fine-tuned through the parameter-efficient fine-tuning to create new representations of the neural embeddings.

The reinforcement learning module 470 can be used to fine-tune the NFM using provided feedback. In some embodiments, the reinforcement learning module 470 can include a reinforcement learning human feedback ("RLHF") model. The reinforcement learning module 470 can receive transcriptions generated by the beam search decoder module 466 and prompt a user and/or caretaker to rank the transcriptions based on the user's true intent. The reinforcement learning module 470 can use the user's response to improve the performance of the NFM. In some embodiments, the reinforcement learning module 470 can freeze one or more parameters and/or layers that are not part of the transcription generation process in order to fine-tune fewer parameters allowing for decreased cost and processing power.

After one or more analytical models have been developed and validated, clinicians can use the NFM modules 440 within the server 435 to decode the speech of the subject on which the NFM modules 440 were trained.

In various embodiments, the stages of the illustrative computing environment 400 can provide unidirectional or bidirectional communications (as indicated in FIG. 4B) by and between the neural interface 410 and the server 435. In various embodiments, one or more of the stages can operate in a serial or parallel manner with other stages of the computing environment 400. It can further be noted that the depicted architecture for the computing environment 400 is simply intended for illustrative purposes and that the computing environment 400 can be arranged differently (i.e., components or stages can be connected in different manners) or include additional components or stages.

Various embodiments of NFMs that can be integrated into the BCI systems described above are illustrated in FIGS. 5-16B. Various features, components, and/or techniques from the embodiments described below can be used in different combinations with each other. Before discussing each of the embodiments in detail, various features that can be incorporated into the embodiments will be discussed.

In some aspects, the feature extraction module can utilize a transformer-based architecture to learn neural representations from the captured brain signals. This transformer-based feature extraction module can include a transformer encoder block. The transformer encoder block can be configured to extract neural representations from the raw signals for a specific task, such as phoneme classification. In certain embodiments, the transformer model can comprise an encoder and a decoder. The encoder can be configured to process the neural embeddings. The processing of the neural embeddings can involve various techniques, such as self-attention mechanisms, to capture spatial and temporal relationships in the neural embeddings. The decoder, on the other hand, can be configured to generate output based on the processed neural embeddings. The output can represent a decoded version of the neural embeddings, which can be used to generate a form of communication, such as speech or text.

Various embodiments of NFM architectures can also include a speech synthesis module. This module can be configured to generate audible speech based on the output of the transformer model. The speech synthesis module can utilize various techniques to generate speech that is natural and intelligible to the user.

In some cases, the NFM architecture can be configured to perform multi-task learning. This can involve processing neural embeddings for multiple tasks in parallel. For example, the system can be configured to decode both speech and motor commands simultaneously. This can enhance the utility of the BCI function, allowing the user to perform multiple tasks concurrently.

In some embodiments, the captured brain signals used for training and/or during execution time of the NFM architecture can be divided into a series of patches 502 and frames 501. Each frame 501 can be collected over a specific time period, which can range from a few milliseconds to several seconds, depending on the classification task. The captured brain signals can be processed using various signal processing techniques. For example, the raw signals can be downsampled and filtered to be within a specific frequency range. This can be done to reduce the computation power required for real-time decoding of the brain signals. The processed signals can then be put into a predetermined analysis window. In some cases, the processed signals can be further processed by extracting the envelope of the signal from every electrode at different frequency bands. The processed signals from different envelopes can be concatenated to form a new feature vector that can be fed to the model. This can help to preserve the spatiotemporal representation that is inherent to the brain signals. In some cases, the transformer encoder block can process the captured brain signals as a series of patches 502 and frames 501. Each frame 501 can be collected over a specific time period, which can range from a few milliseconds to several seconds, depending on the classification task. The patches 502 and frames 501 can then be linearly projected to a lower dimension and flattened to form input embeddings. In some cases, the transformer encoder block can add positional encoding to each patch 502 and frame 501 in the sequence to consider the order of frames 501 and patches 502 in the data. As used in the technical field, positional encoding is used to provide a relative position for each token or word in a sequence. Once the input embeddings and the position encodings are added, the output can be fed to transformer encoder blocks. The transformer encoder blocks can employ self-attention to capture spatial relationships between all patches 502 in each frame 501 as well as temporal relationships between frames 501.

Various embodiments of NFM architectures can include a feature extraction module configured to process the captured brain signals and generate neural embeddings. The neural embeddings can represent a data-driven neural representation of the captured brain signals. The feature extraction module can use a transformer encoder block to extract neural representations from the captured brain signals. The transformer encoder block can be configured to process the captured brain signals as a series of patches 502 and frames 501, preserving the spatial and temporal representation of the signals.

In some embodiments, the feature extraction module can be trained or otherwise configured to perform multi-task learning. This approach can involve processing neural embeddings for multiple tasks in parallel. For example, the NFM architecture can be configured to decode both speech and motor commands simultaneously. This can enhance the utility of the BCI function, allowing the user to perform multiple tasks concurrently. The multi-task learning approach can involve sharing a set of parameters across multiple tasks, thereby enabling the system to learn a global representation of brain recordings. In addition, a task-specific class (CLS) token could be used to learn the brain recording representation for any given tasks. A classification token is a vector of numbers that is learned by the NFM encoder during training. This approach can allow the system to tailor the feature extraction process to the specific requirements of each task, thereby improving the accuracy and versatility of the BCI system.

The feature extraction module can be trained using data obtained from a number of different subjects. This approach can be used to make the feature extraction process robust to subject variability. By training the feature extraction module on brain signals from multiple subjects, the system can be able to learn a more generalized representation of brain recordings. This can allow the system to better handle the variability in brain signals between different subjects, thereby improving the performance of the BCI system across a wider range of users. The training process can involve adjusting the parameters of the feature extraction module based on the brain signals from each subject, thereby fine-tuning the feature extraction process to the specific characteristics of each subject's brain signals. This approach can allow the system to adapt to the unique characteristics of each subject's brain signals, thereby improving the accuracy and personalization of the BCI system.

In some embodiments, the NFM architecture can employ a unified attention mechanism to learn spatiotemporal representations of brain recordings. This approach can involve decoupling the spatial and temporal representation of the brain signals using separate spatial and temporal transformer blocks. Each of these transformer blocks can be configured to process the neural embeddings in a specific manner. For instance, the spatial transformer block can be configured to process the spatial representation of the neural embeddings, while the temporal transformer block can be configured to process the temporal representation of the neural embeddings. This approach can allow the system to capture both the spatial and temporal characteristics of the brain signals, thereby improving the accuracy and versatility of the BCI system.

In some embodiments, the NFM architecture can employ a unified attention mechanism that considers both the spatial and temporal representation of the brain recordings. This unified attention mechanism can involve processing the neural embeddings using a single transformer block that is configured to capture both the spatial and temporal characteristics of the brain signals. This approach can allow the system to learn a more comprehensive representation of the brain signals, thereby improving the performance of the BCI system. The unified attention mechanism can involve processing the neural embeddings in a manner that preserves the inherent spatiotemporal pattern of the brain signals. This can involve processing the neural embeddings as a series of patches 502 and frames 501, with each patch 502 and frame 501 representing a specific spatial and temporal characteristic of the brain signals. The unified attention mechanism can then use self-attention to capture the relationships between the patches 502 and frames 501, thereby learning a comprehensive spatiotemporal representation of the brain signals. This approach can allow the system to better understand and interpret the brain signals, thereby improving the accuracy and personalization of the BCI system.

The transformer model can be trained or otherwise configured to decode the neural embeddings into phonemes or other similar outputs. The encoder of the transformer model can be configured to process the neural embeddings, while the decoder can be configured to generate output based on the processed neural embeddings. The output can represent a decoded version of the neural embeddings, which can be used to generate a form of communication, such as speech or text.

In some embodiments, the transformer model can be fine-tuned using reinforcement learning from human feedback to improve transcription generation. This can involve generating multiple transcriptions from the decoded neural embeddings, receiving user feedback on the quality of the generated transcriptions, constructing a reward function based on the user feedback, and adjusting parameters of the transformer model to maximize the expected cumulative reward.

In some embodiments, the transformer model can be fine-tuned using parameter-efficient fine-tuning techniques to selectively update a subset of the transformer model parameters. This can involve freezing a subset of the parameters of the transformer model and training selected layers. This approach can reduce the number of parameters needed for fine-tuning, allowing the transformer model to be fine-tuned on a smaller number of samples and enabling few-shot learning.

The transformer model can further be trained or otherwise configured to process user embeddings along with the neural embeddings to generate personalized output. The user embeddings can be generated based on user-specific information, such as the user's age, gender, handedness, array placement in the brain, or device information. This can help to personalize the speech or text output to each individual user.

Figure 5:
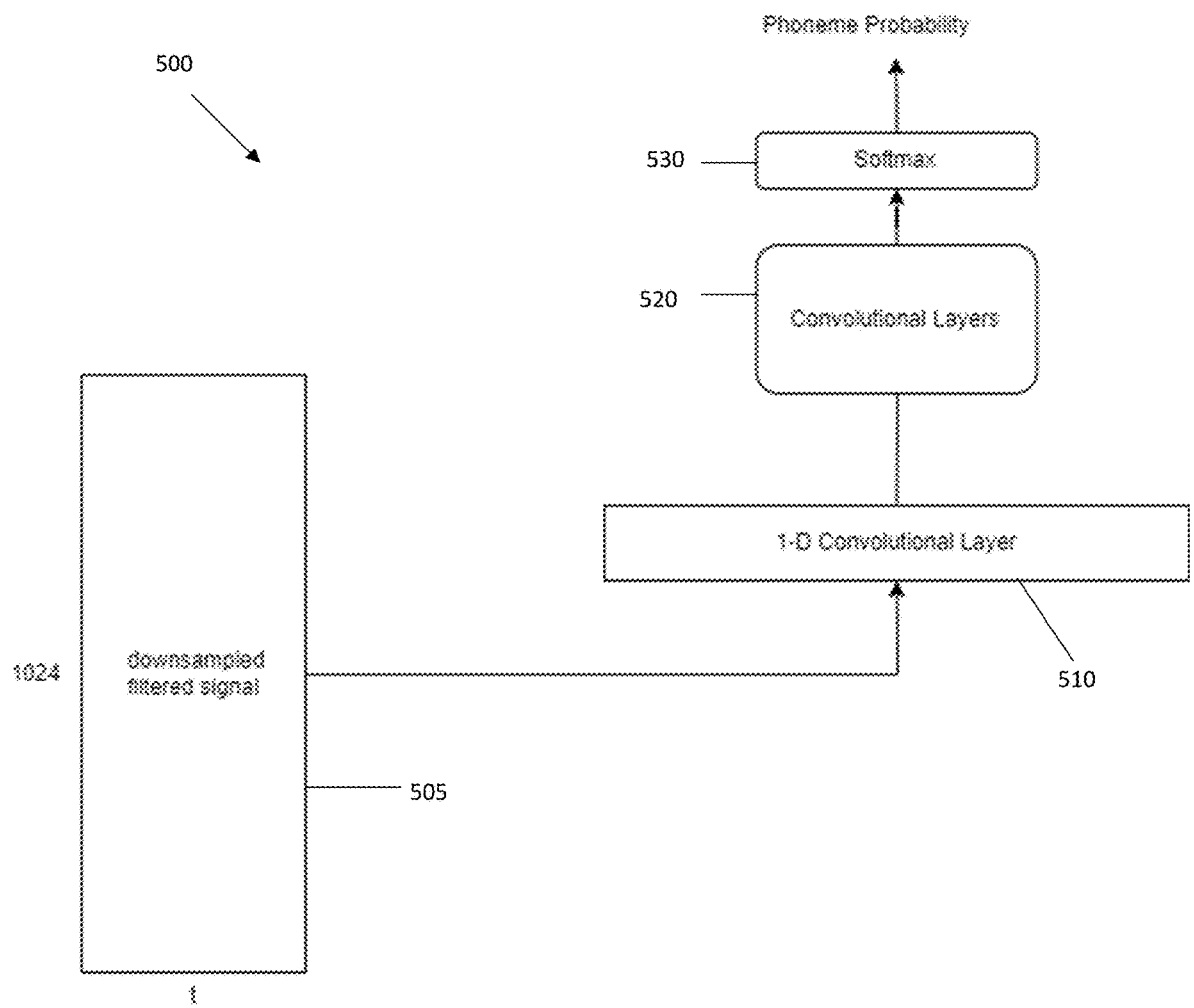
FIG. 5 depicts a general diagram of a NFM architecture adapted to predict speech, in accordance with illustrative embodiments.

Turning now to specific embodiments of NFM architectures, FIG. 5 shows a general diagram of an NFM architecture 500 adapted to predict speech phonemes, in accordance with example embodiments. The NFM architecture 500 can include a one-dimensional convolutional layer 510, one or more convolutional layers 520, and a softmax layer 530. The NFM architecture 500 can be programmed or otherwise configured to receive a downsampled, filtered neural signal 505 from a neural interface, such as the neural device 110 described above. The NFM architecture 500 can further include algorithms or other processes for generating the downsampled, filtered signal 505. The downsampled filtered signals from the 1024 electrodes 505 can be fed into the one-dimensional convolutional layer 510 wherein the layer extracts temporal features. The downsampled filtered signals 505 can be arranged as a three-dimensional array of signals 501. As generally described above, the electrode array 180 consists of a two-dimensional array of electrodes, which is configured to rest against the subject's cortical surface and capture a corresponding two-dimensional set of data of the electrical activity along the cortical surface. Successive sets of two-dimensional electrocortical data can further be arranged temporally to form a three-dimensional array of electrocortical data. In some embodiments, the array of signals can include brain signals captured from a high-resolution electrode array 180, such as is described above. The output of the one-dimensional convolutional layer 510 can be input to one or more convolutional layers 520. The one or more convolutional layers 520 can include one or more feedforward networks. The one or more convolutional layers 520 can use signal processing techniques for extracting an envelope of the signal from a plurality of electrodes at different frequency bands. The processed signals from different envelopes can be concatenated to form a new feature vector that can be fed to the NFM. The softmax layer 530 can output phoneme probabilities based on the representations learned by the one or more convolutional layers 520. However, such general techniques tend to overfit quickly and the NFM performance can plateau quickly. The spatial representation of the signal can also be lost as the signal is vectorized over the frequency channels. Thus, modules can be added to the NFM architecture 500 such that spatial and temporal representations of the signal can be preserved.

Figure 6:
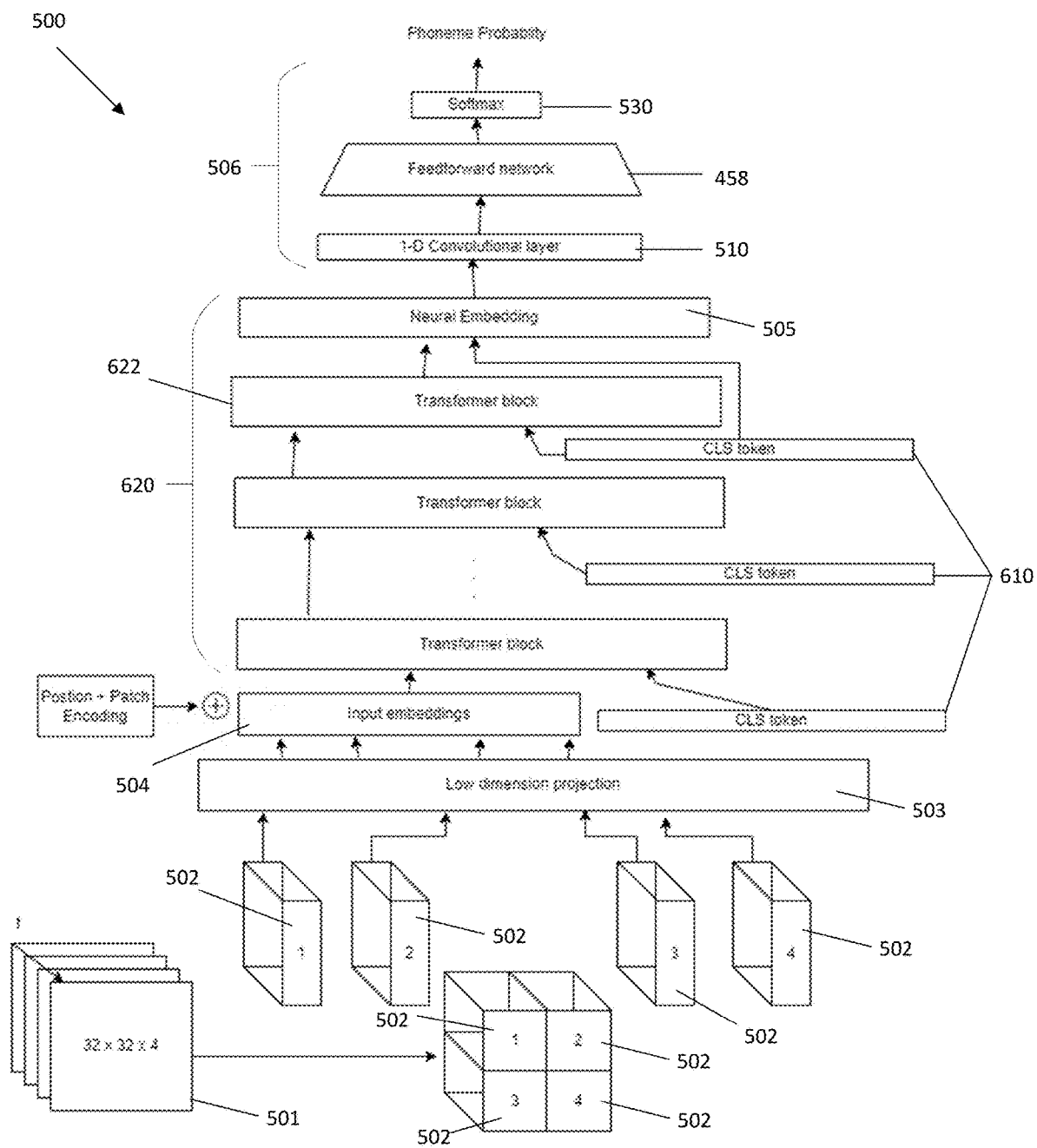
FIG. 6 depicts a NFM architecture adapted to extract features from recorded brain signals prior to speech prediction, in accordance with illustrative embodiments.

In some embodiments, the NFM can include a feature extraction module 450 to preserve the spatial and temporal representation of the brain signal. FIG. 6 shows an NFM architecture 500 adapted to extract features from recorded brain signals prior to speech prediction, in accordance with example embodiments. In the depicted embodiment, the NFM architecture 500 includes a set of transformer blocks 620 that receive input embeddings 504 generated from a low-dimension projection 503 of neural data that, in some cases, can have been divided into patches 502 from frames 501 of the neural data. The transformer blocks 620 can generate neural embeddings 505, which can in turn be fed through feedforward network 506 consisting of a convolutional layer 505, a feedforward network body 458, and a softmax layer 530 to output phoneme probability associated with the neural data.

The feature extraction module can extract features from the recorded brain signals by dividing the signal into frames 501 and patches 502 to enable separation of the spatial and temporal representation. The brain signals can be recorded for a set length of time. A multidimensional array can be generated including the signal captured from each electrode at each time step in a predetermined frequency band. As such, the dimensions of the array can be the spatial arrangement of the electrocortical data (which corresponds to the spatial arrangement of the electrodes that make up the electrode array 180) relative to the number of time steps elapsed at one or more predetermined frequency bands. The recorded brain signals can include a time stamp at each time step. A four-dimensional array can be generated by reshaping the recorded brain signals at each time step into a three-dimensional frame 501, such that the brain signals are formed into a time-ordered array of the frames 501. For example, the brain signals recorded by an embodiment of the electrode array 180 described above can form a 33×31×4 frame 501 corresponding to the spatial arrangement of the electrodes that make up the electrode array 180 for four distinct frequency bands at a given time step. Each frame 501 can be divided into a plurality of patches 502. In some embodiments, each frame 501 can be divided into four patches 502. The plurality of patches 502 can vary in size and extend over the frame 501 in which case the patch 502 can be filled with values from the nearest electrodes. The patches 502 can be linearly projected to a lower dimension and flattened.

The projected patches 502 can be used as the input embeddings. In some embodiments, each patch in a frame 501 can correspond to at least one input embedding. A task specific classification (CLS) token 610 can be added to the input embedding to serve as a representation of the patches 502 and frames 501 for a given window. Transformer blocks 620 can be used to extract neural representations that are useful in a phoneme classification task wherein the NFM learns a latent representation of the neural recording that is useful in predicting the correct phonemes associated with a neural representation. Each transformer block 620 can include one or more self-attention modules 454. In some embodiments, the CLS token representation from the last transformer block can be used to represent the neural embeddings for the corresponding neural data.

A positional encoding of the patches 502 within each frame 501 can be added to consider the order and position of patches 502 within a frame 501 and relative to the sequence of frames 501 in the data. These positional encodings of patches can also enable the model to perform electrode selections e.g., attending to at least one or more electrodes that convey more information about the underlying neural signal. The transformer blocks 620 can receive the input embeddings and the positional encodings. The one or more self-attention modules 454 of the transformer block 620 can capture spatial relationships between patches 502 and temporal relationships between patches 502 in multiple frames 501. In some embodiments, the CLS token from the last transformer block 622 can indicate a spatiotemporal representation, hereafter called neural embeddings, of the brain signals. These neural embeddings can be used as an input to decoding tasks hence reducing the amount of data that is needed for training task-specific decoder models 456. In some embodiments, the neural embeddings can be passed to a one-dimensional convolutional layer 510 and a feedforward network module 458. A softmax layer 530 can then generate task specific probabilities for a variety of classification and regression tasks. For example, in speech decoding the task specific head can return phoneme probabilities based on the output of the feedforward network module 458.

Figure 7A:
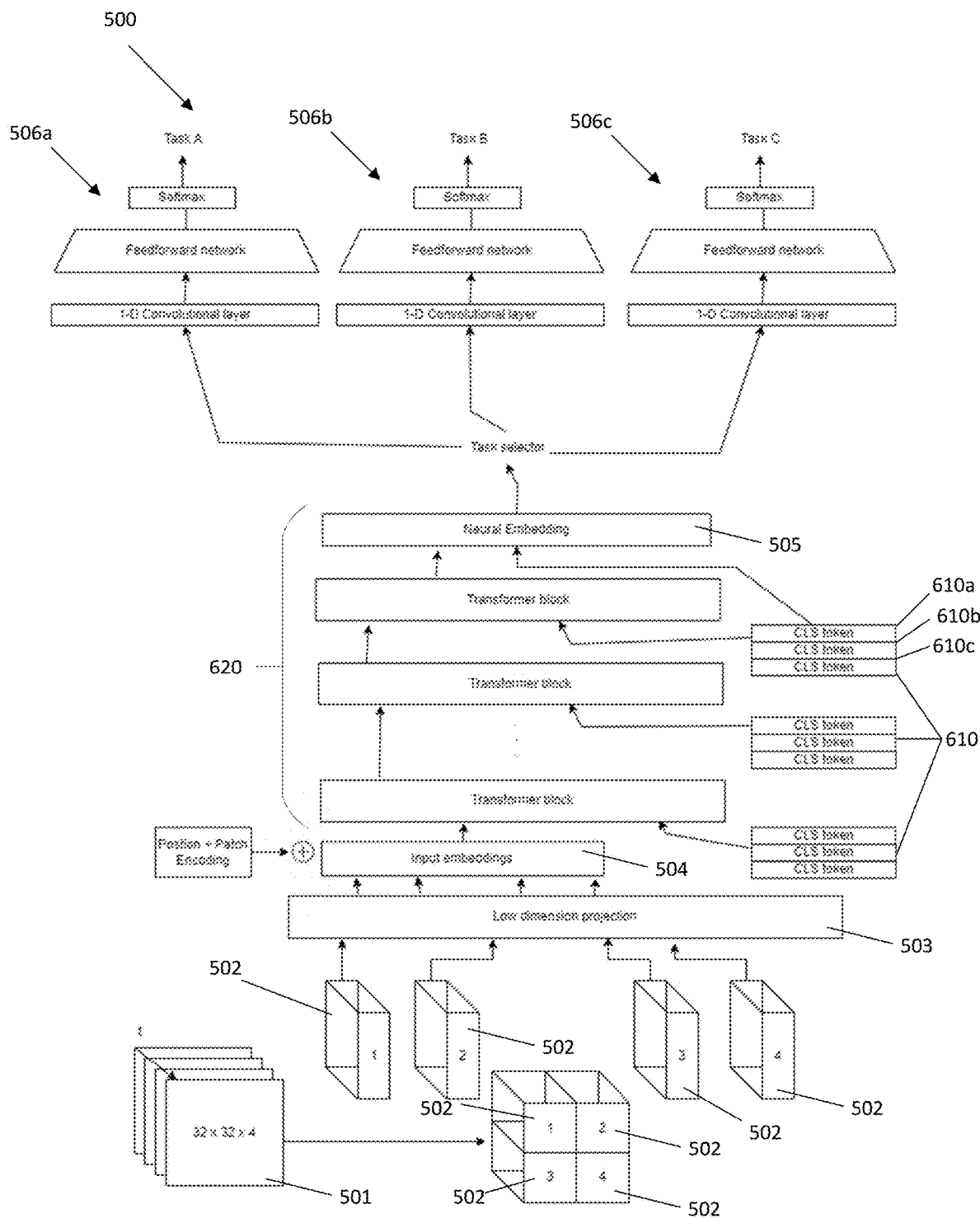
FIG. 7A depicts a NFM architecture adapted to perform a plurality of tasks in parallel via parameter sharing, in accordance with illustrative embodiments.
Figure 7B:
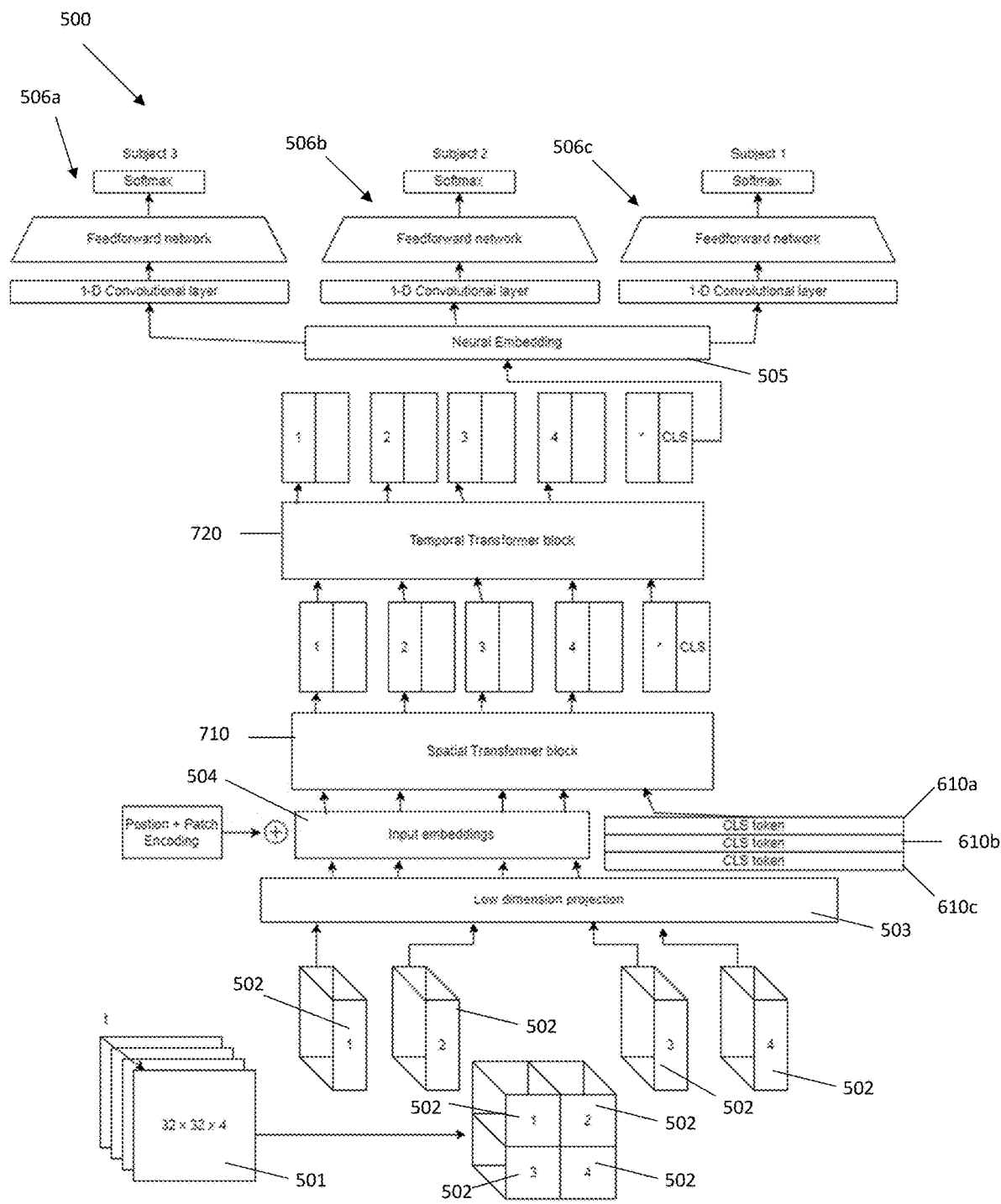
FIG. 7B depicts a NFM architecture adapted to perform speech prediction on a plurality of subjects via parameter sharing, in accordance with illustrative embodiments.

In some embodiments, the NFM can perform a plurality of tasks and/or perform decoding on a plurality of subjects, i.e., the NFM can be configured for multi-tasking. The NFM can use spatial and temporal transformer blocks to preserve the spatiotemporal features in the recorded brain signals. FIGS. 7A-7B show embodiments of an NFM architecture 500 adapted to perform a plurality of tasks in parallel or perform decoding on a plurality of subjects via parameter sharing, rather than being adapted to perform a single task as in FIG. 6. The NFM architecture 600 can be adapted to perform a plurality of tasks in parallel through sharing a set of parameters 620. In some embodiments, the CLS token 610 can be shared by the plurality of tasks to learn a global representation of the brain recordings. The NFM architecture 500 can utilize a plurality of tailored CLS tokens 610*a-c* that correspond to separate tasks. For example, the CLS tokens 610*a-c* can correspond to tasks including phoneme decoding 610*a*, motion decoding 610*b*, and/or classifying the positions of a given stimuli 610c. The different tasks can correspond to separate subjects and/or subjects and/or decoding tasks.

The neural embedding generated by the shared transformer blocks module 620 can be fed to each task as an input. For example, the neural embedding can be used to train a model for the task of phoneme decoding and/or a variety of motion decoding such as hand gestures and finger movements. Note that each task can have different architectures and requirements. The neural representation that is learned from the shared transformer blocks 620 can enable new task learning across a variety of subjects especially when the data specific tasks are rare.

In the embodiment depicted in FIG. 7A, the NFM architecture 500 includes a set of transformer blocks 620 that receive input embeddings 504 generated from a low-dimension projection 503 of neural data that, in some cases, can have been divided into patches 502 from frames 501 of the neural data. The transformer blocks 620 can generate neural embeddings 505, which can in turn be fed through multiple feedforward networks (e.g., three feedforward networks 506a, 506b, 506c as shown in FIG. 7A) that each provide outputs for different tasks associated with the neural data (e.g., phoneme probability or motion probability). The shared transformer blocks 620 rely on the self-attention module 454 to learn both the spatial and temporal representations. The separate spatial transformer block 710 and temporal transformer block 720 can provide a more clearly preserved spatiotemporal pattern from the brain signals than the shared transformer blocks 620 while reducing the number of operations needed to calculate the attention across the space and time axes.

In some embodiments, the transformer blocks 620 can include a spatial transformer block 710 and a temporal transformer block 720 to detangle the representation learned through one shared transformer block. Each transformer block 710, 720 can use a self-attention module 454 that can be specialized to perform the given function. The separate spatial transformer block 710 and temporal transformer block 720 of FIG. 7B can be a portion of the plurality of shared transformer blocks 620 shown in FIG. 7A. As with FIG. 7A, the embodiment of the NFM architecture 500 depicted in FIG. 7B includes a set of transformer blocks 710, 720 that receive input embeddings 504 generated from a low-dimension projection 503 of neural data that, in some cases, can have been divided into patches 502 from frames 501 of the neural data. The transformer blocks 620 can generate neural embeddings 505, which can in turn be fed through multiple feedforward networks (e.g., three feedforward networks 506a, 506b, 506c as shown in FIG. 7A) that each provide outputs for different tasks associated with the neural data (e.g., phoneme probability or motion probability). However, the embodiment of the NFM architecture 500 in FIG. 7B differs from the embodiment shown in FIG. 7A in that it utilizes a separate spatial transformer block 710 and a separate temporal transformer block 720.

Figure 8:
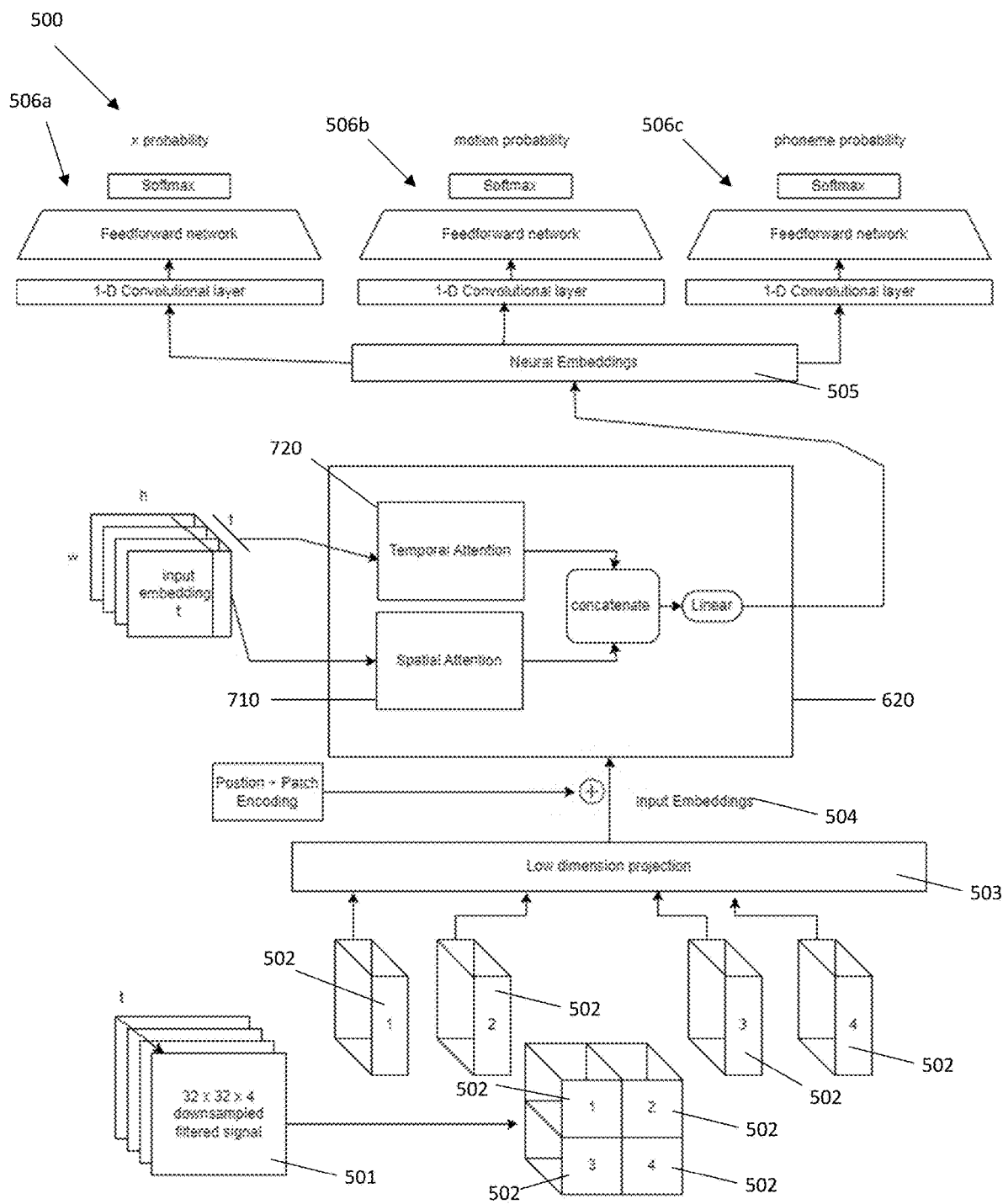
FIG. 8 depicts a NFM architecture adapted to encode recorded brain signals via parallel, specialized attention blocks, in accordance with illustrative embodiments.

In some embodiments, the NFM can execute the spatial transformer and the temporal transformer in parallel to optimize the preservation of the spatiotemporal features from the recorded brain signals. FIG. 8 shows an embodiment of an NFM architecture 500 adapted to encode recorded brain signals via parallel, specialized attention blocks, in accordance with example embodiments. In the depicted embodiment, the NFM architecture 500 includes a transformer block 620 that implements spatial attention 710 and temporal attention 720 in parallel and receives input embeddings 504 generated from a low-dimension projection 503 of neural data that, in some cases, can have been divided into patches 502 from frames 501 of the neural data. The transformer block 620 can generate neural embeddings 505, which can in turn be fed through multiple feedforward networks (e.g., three feedforward networks 506a, 506b, 506c as shown in FIG. 7A) that each provide outputs for different tasks associated with the neural data (e.g., phoneme probability or motion probability). The transformer blocks 620 can include a unified self-attention module 454 that operates a spatial attention 710 and a temporal attention 720 in parallel to learn an aggregate representation of the brain signals. The concatenated aggregate representation can be linearly mapped prior to being output as the output embeddings.

Figure 18:
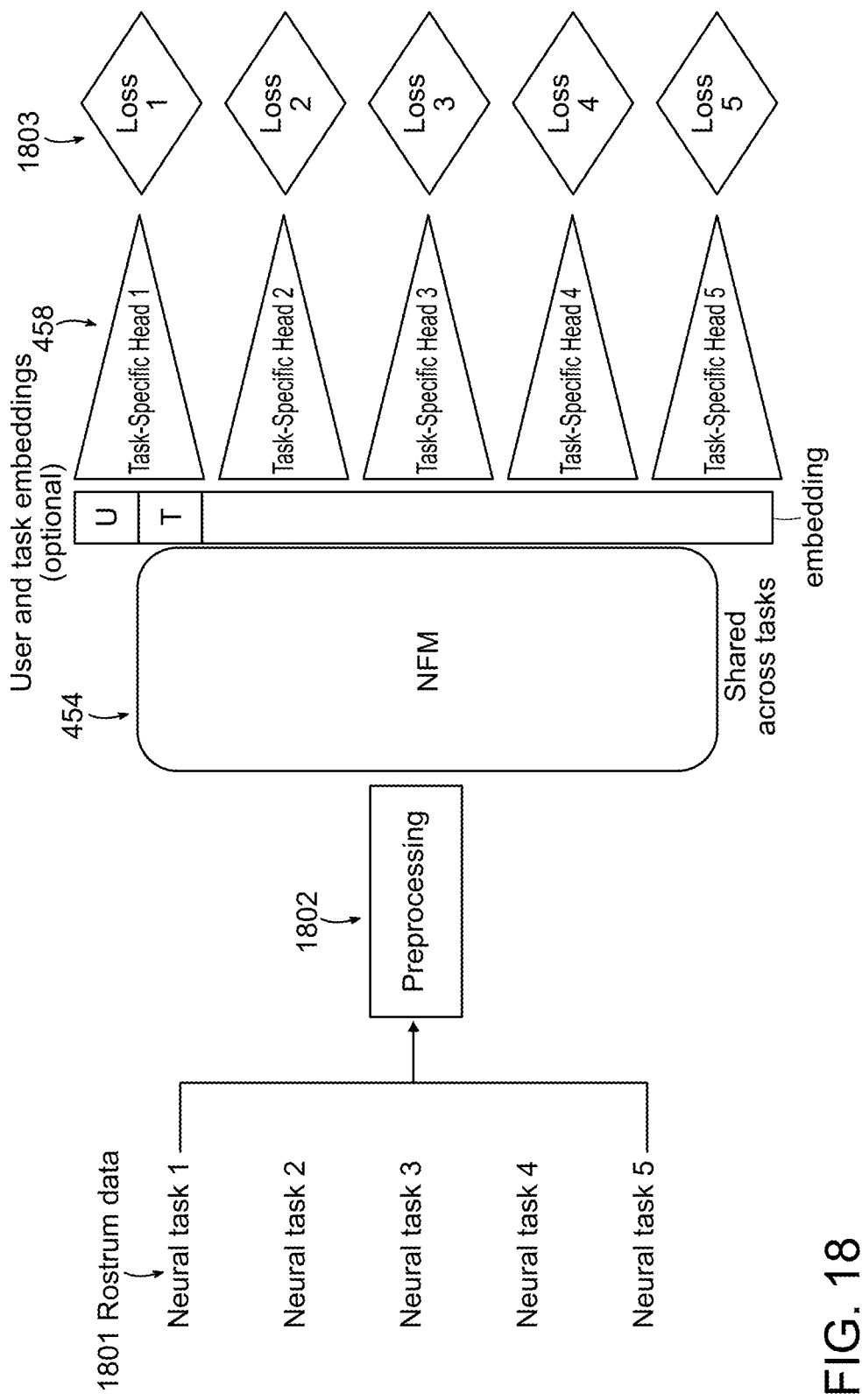
FIG. 18 depicts a multitasking model architecture, in accordance with example embodiments.
Figure 19:
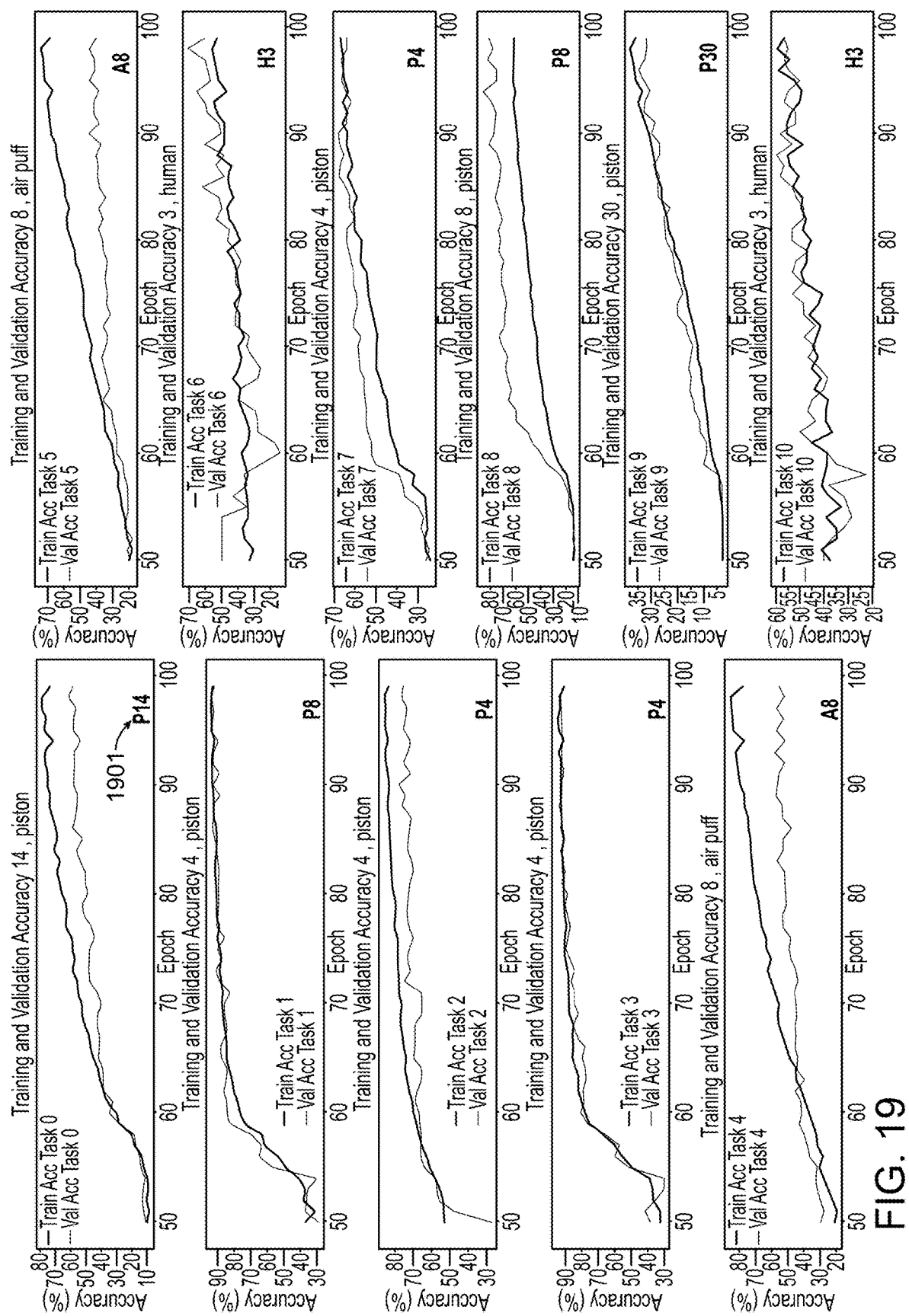
FIG. 19 depicts multitasking performance results on training and validation datasets, in accordance with example embodiments.

In some embodiments, the NFM is applied for decoding data captured from rostrums. For example, different spots on the rostrum can be stimulated using different mechanism, for example using a pressurized air puff or a mechanical arm. Each spot on the rostrum would then correspond to a class that the NFM needs to decode, i.e., this a classification problem wherein the NFM needs to learn from the neural data which spot on the rostrum was stimulated across multiple sessions and subjects. Due to the high variabilities in the collected data, e.g., different rostrum shapes, time of a session in the day, and the type of stimuli used in each session and subject these variabilities are all treated as a new task when training the NFM. For example, a task may correspond to a rostrum X that was stimulated at eight different locations randomly for several minutes in the morning and another to rostrum Y stimulated at ten different locations in the afternoon. In this experiment, the NFM was trained on eleven tasks and five subjects, each task corresponding to a different classification problem. As shown in FIG. 18, the rostrum data corresponding to each task 1801 are preprocessed through a normalization module wherein the values of the electrodes are set to be within a specific pre-determined range 1802. The multitask dataset are then fed to the encoder portion of the NFM 454, wherein the parameters of the NFM are shared across all tasks. The output from the NFM, the neural embeddings, are fed to a shallow SoftMax layers, i.e., task-specific head 458 that predicts the class location for a given task using a cross-entropy loss function 1803. FIG. 19 depicts the accuracy performance of the training and validation dataset for several tasks as the NFM training was in progress. The reference characters 1901 in the bottom right portion of each plot represent the type of stimuli applied ("A" for air puff, "P" for piston, and so on) and the number of positions a rostrum was stimulated. For example, P14 indicates a 14-class decoding using a piston stimulus. As shown in FIG. 19, the performance accuracy on the validation dataset rises as training progresses for all tasks, albeit the rise is slower for some tasks than others.

Figure 20:
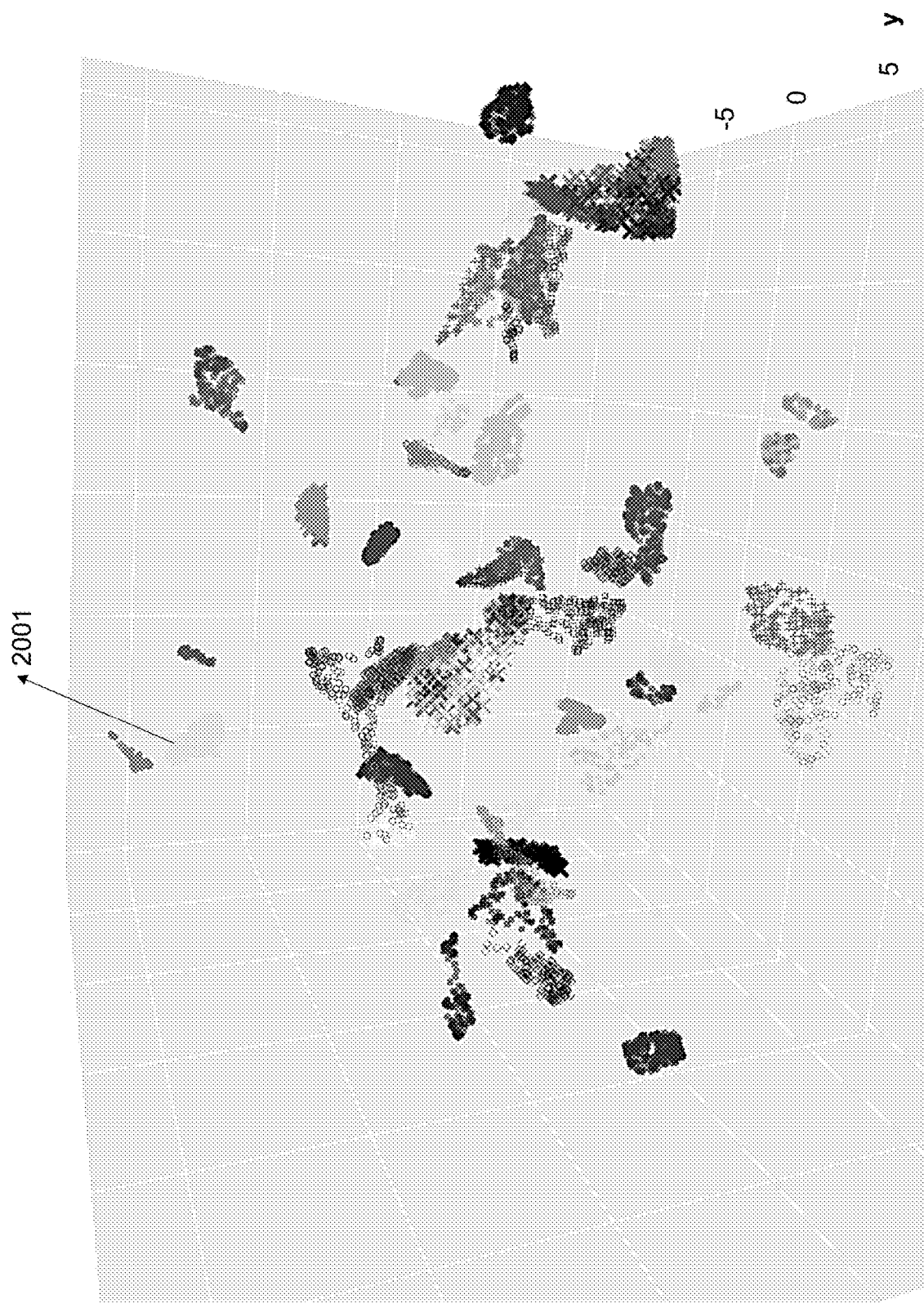
FIG. 20 depicts neural embeddings corresponding to each task and class projected down to three dimensions for visualization, in accordance with illustrative embodiments.

In some embodiments, the output from the shared NFM 454, i.e., the neural embeddings corresponding to each task and class 2001, were projected down to three dimensions for visualization as shown in FIG. 20. Each cluster of points represents the neural embeddings corresponding to one subject, one task and one class. The neural embeddings from the same subject and stimulus tend to cluster more closely together. These clusters represent how the NFM can find shared representations that is robust across subjects, stimulus, and sessions.

Figure 21:
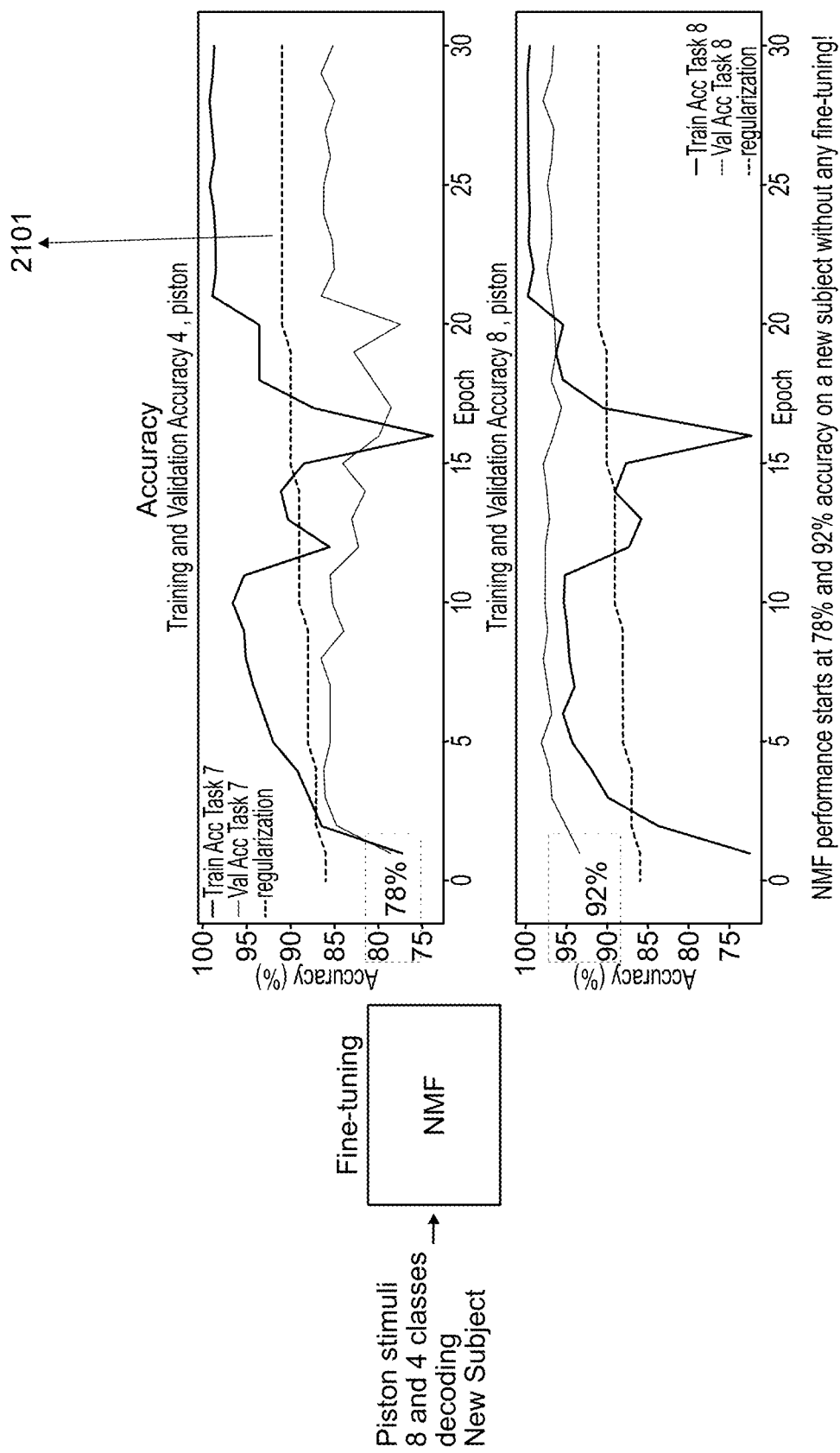
FIG. 21 depicts task transfer performance, in accordance with illustrative embodiments.
Figure 22:
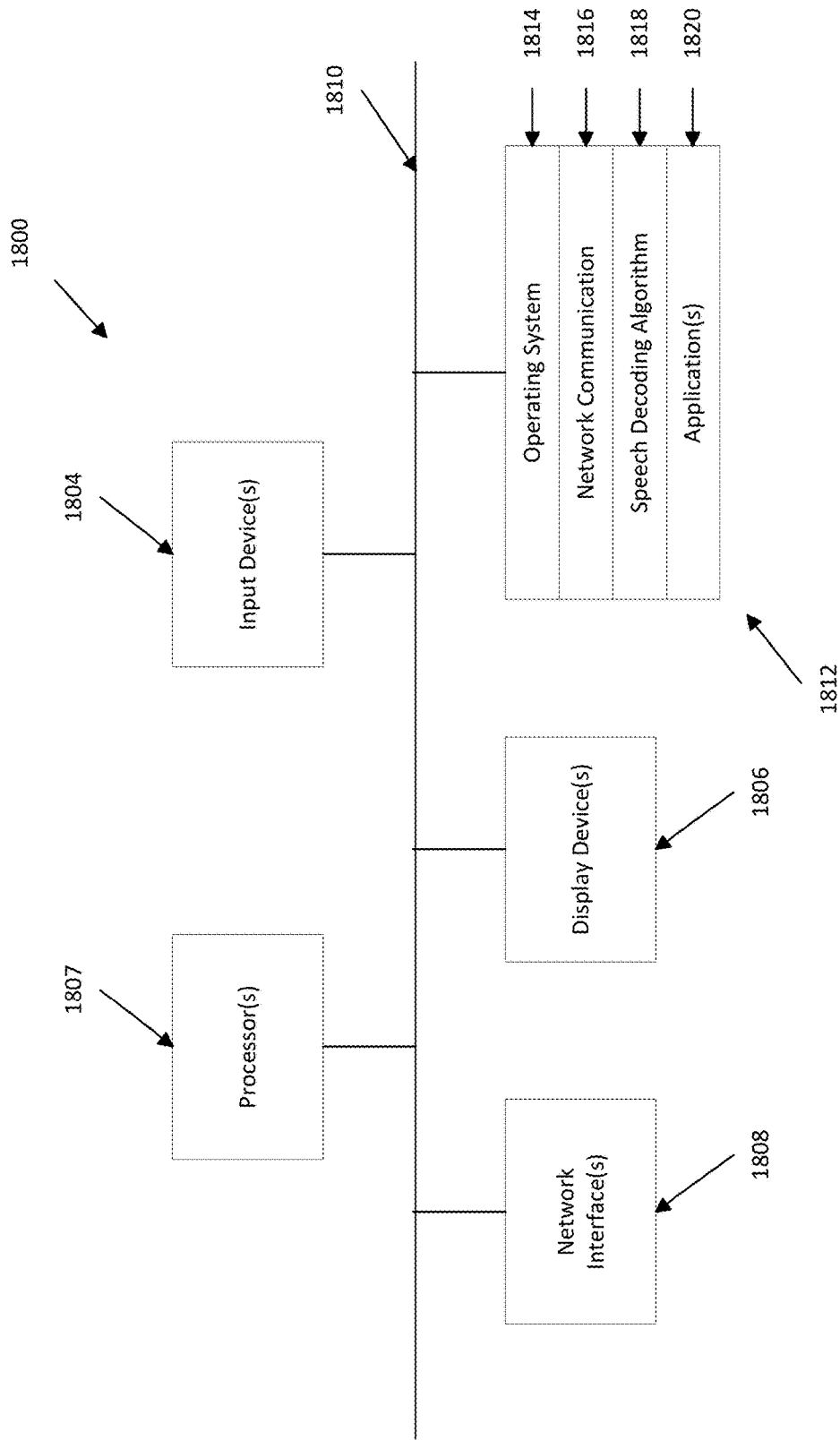
FIG. 22 depicts a block diagram of an example computing device, in accordance with illustrative embodiments.

In some embodiments, the encoder portion of the NFM was used to encode a new subject neural data that it had not seen before as shown in FIG. 21. The training and validation accuracy performance of these new tasks during fine-tuning the NFM started at very high accuracies. This enables the NFM to quickly adapt its representations on new tasks using only a few examples.

Figure 9:
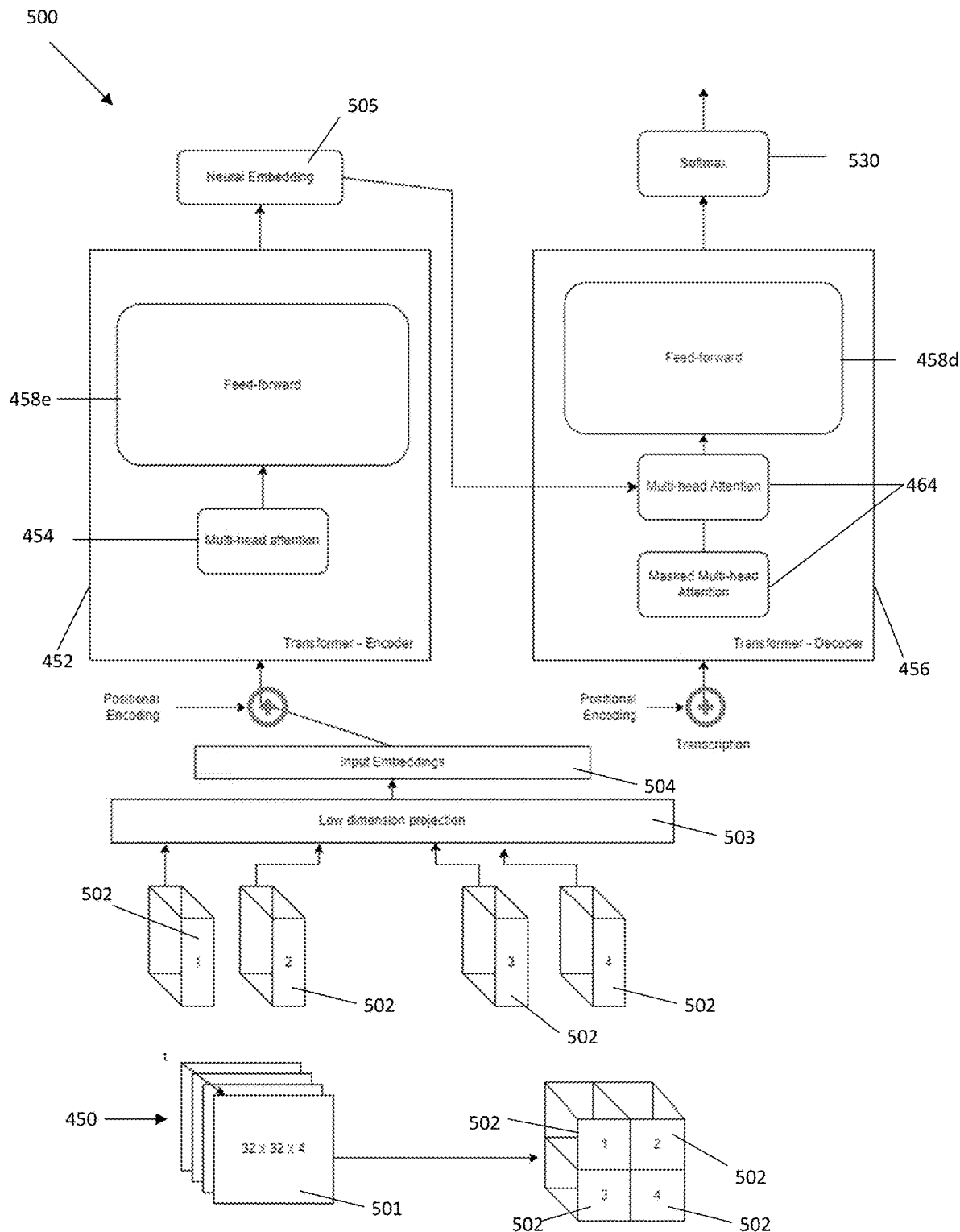
FIG. 9 depicts a diagram of a NFM architecture including an encoder and a decoder attention mechanism, in accordance with illustrative embodiments.

In some embodiments, an encoder and a decoder both comprise of transformer blocks. FIG. 9 shows a diagram of an NFM architecture 500 including an encoder and a decoder attention mechanism, in accordance with example embodiments. In the depicted embodiment, the NFM architecture 500 includes an encoder 452 that receives input embeddings 504 generated from a low-dimension projection 503 of neural data that, in some cases, have been divided into patches 502 from frames 501 of the neural data. The encoder 452 can generate neural embeddings 505, which can in turn be fed through a decoder 456 to output provide an output associated with the neural data (e.g., phoneme probability). Encoder module 452 can receive spatiotemporal features from the feature extraction module 450. Encoder module 452 can include one or more attention modules 464. In some embodiments, the transformer encoder module 452 can include one or more self-attention modules 454. The output of the one or more self-attention modules 454 can be normalized. The encoder module 452 can include a feedforward network module 458e, which can receive the normalized output of the one or more self-attention modules 454 and generate encoded representations of the brain signals, i.e., neural embeddings.

The transformer decoder module 456 can receive the neural embeddings along with the ground truth. The transformer decoder module 456 can include one or more attention modules 464 and a feedforward network module 458d. In some embodiments, the one or more attention modules 464 can include a masked multi-head attention block. The output of the feedforward network module 458e of the encoder module 452 can be input to the one or more attention modules 464. The feedforward network module 458d of the decoder module 456 can receive an output from the one or more attention modules 464 and generate a decoded representation of the brain signals. A softmax layer 530 can receive the decoded representation and generate a probability of the most likely phonemes at each time step based on the decoded representation. The advantages of having a transformer decoder block are enabling the NFM to learn which neural embeddings to attend during decoding.

Figure 10:
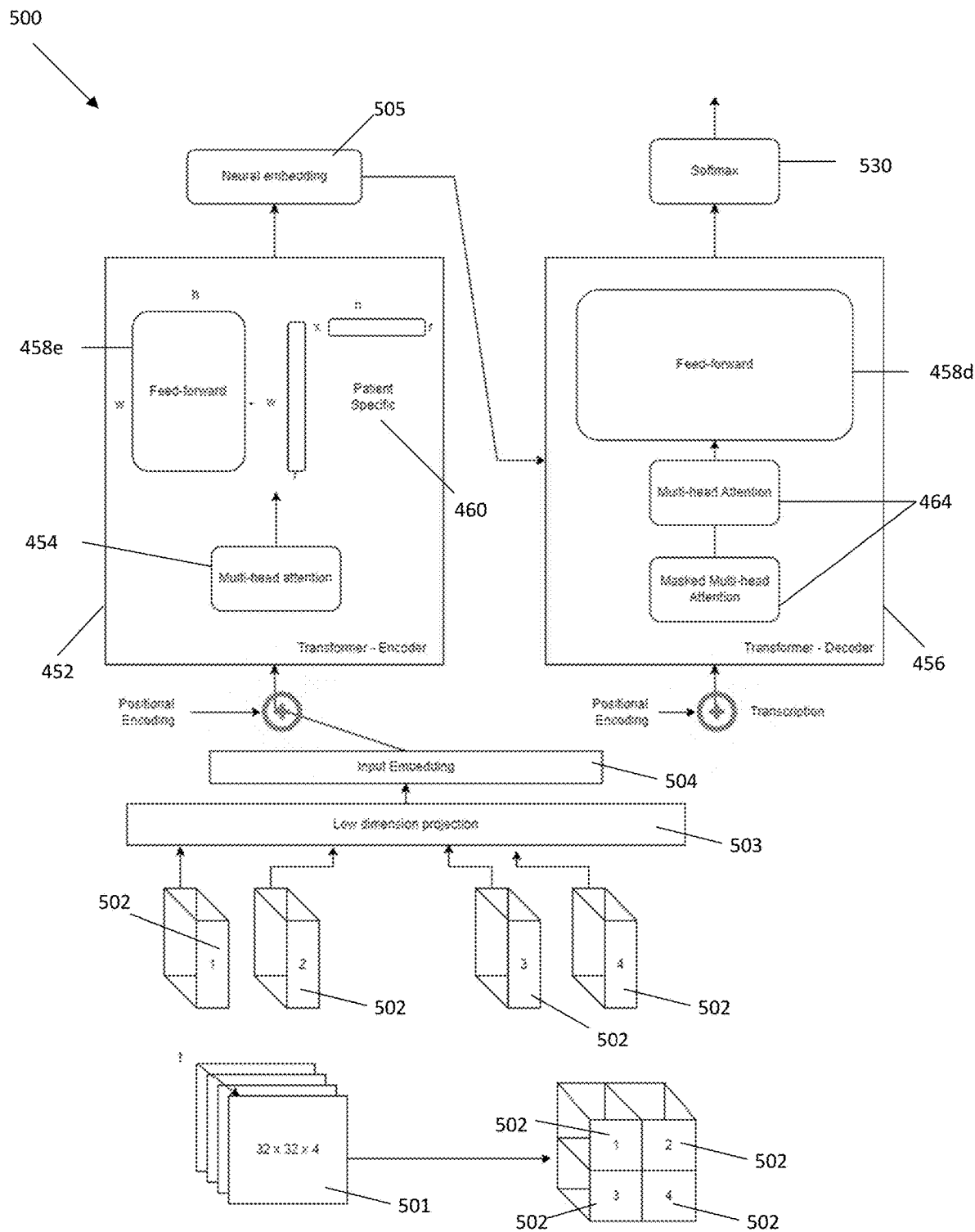
FIG. 10 depicts a NFM architecture adapted to encode recorded brain signals with reduced parameters incorporating a subject specific embedding, in accordance with illustrative embodiments.

In some embodiments, the NFM architecture 500 can include a subject-specific encoder adapted to enable personalization and reduce the number of parameters required to be fine-tuned, as opposed to training all the parameters for the generalized encoder 452 as in the embodiment shown in FIG. 9. FIG. 10 shows an embodiment of an NFM architecture 500 adapted to encode recorded brain signals with reduced parameters incorporating a subject specific embedding, in accordance with example embodiments. As with the embodiment shown in FIG. 9, the depicted embodiment of the NFM architecture 500 includes an encoder 452 that receives input embeddings 504 generated from a low-dimension projection 503 of neural data that, in some cases, can have been divided into patches 502 from frames 501 of the neural data. The encoder 452 can generate neural embeddings 505, which can in turn be fed through a decoder 456 to output provide an output associated with the neural data (e.g., phoneme probability). This embodiment differs from the embodiment shown in FIG. 9 in that the encoder 452 includes a subject-specific encoder module 460, which is described in greater detail below.

The encoder module 452 can include one or more self-attention modules 454, a feedforward network module 458e, and a subject-specific encoder module 460. The feedforward network module 458e can receive the output of the one or more self-attention modules 454 and generate an encoded representation of the brain signals. For example, the subject-specific encoder module 460 can be trained from data gathered for a specific subject attempting to speak. The output of the feedforward network module 458e can be weighted summed with the output of the subject-specific encoder module 460 to generate the embedded output of the encoder module 452. The outputs of the feedforward network module 458e and the subject-specific encoder module 460 can be weighted summed to avoid catastrophic forgetting and to hold to the contextualized representation of what the encoder module 452 has learned from a plurality of subjects and tasks prior to being used for the specific subject.

Figure 11:
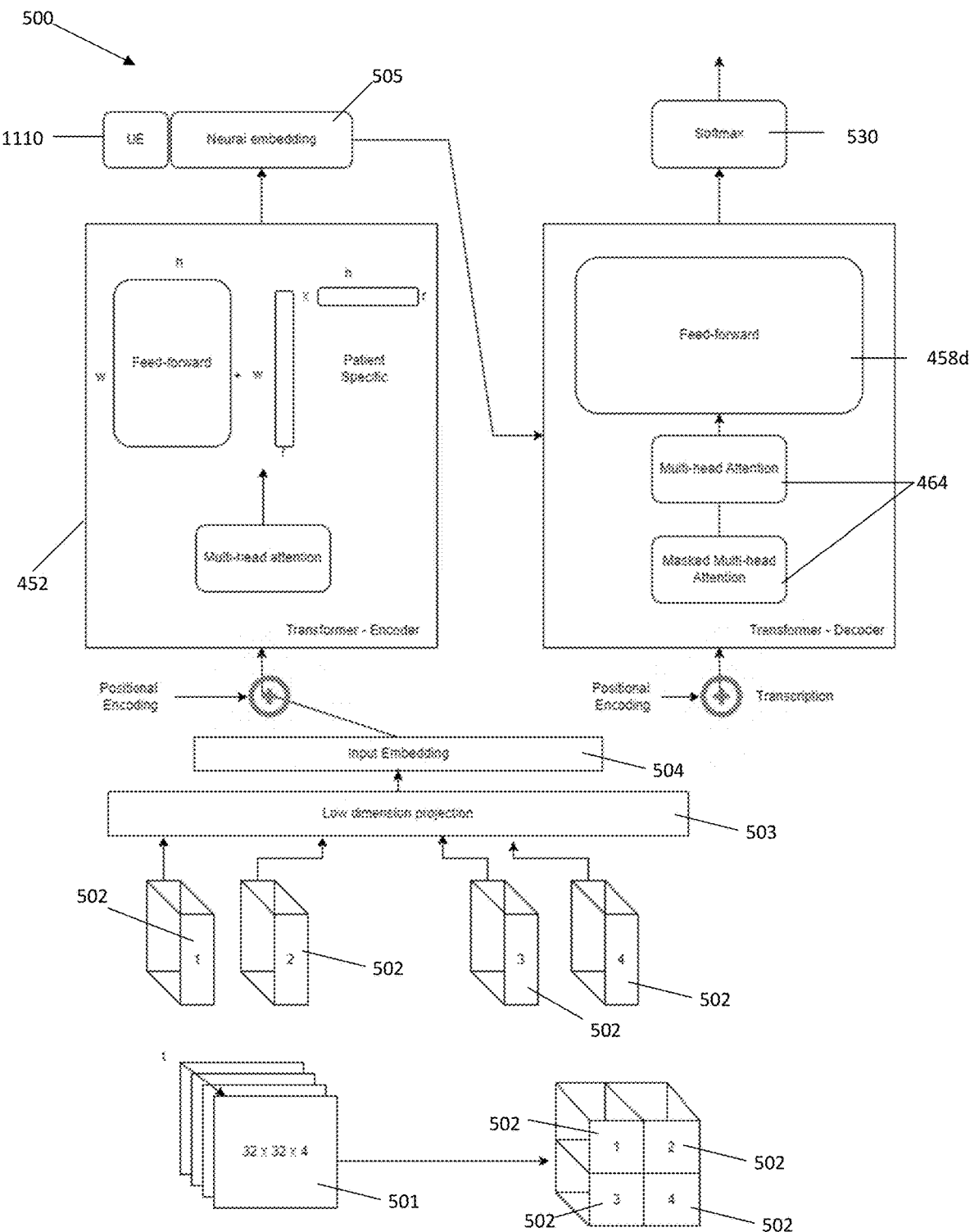
FIG. 11 depicts a NFM architecture adapted to include a subject profile in the output embedding, in accordance with illustrative embodiments.

In some embodiments, the NFM can include a subject profile embedding concatenated to the output of the encoder. FIG. 11 shows an embodiment of an NFM architecture 500 adapted to include a subject profile in the neural embedding, in accordance with example embodiments. In the depicted embodiment, the NFM architecture 500 includes an encoder 452 that receives input embeddings 504 generated from a low-dimension projection 503 of neural data that, in some cases, can have been divided into patches 502 from frames 501 of the neural data. The encoder 452 can generate neural embeddings 505, which can in turn be fed through a decoder 456 to output provide an output associated with the neural data (e.g., phoneme probability). The depicted embodiment differs from the embodiments shown in FIGS. 9 and 10 in that the NFM 500 can be tailored to a specific subject by concatenating the output of the encoder module 452 with a user embedding 1110. The user embedding 1110 can include user profile and digital history that can be used to create a personalized experience for the user. The user profile can include, for example, one or more of the user's age, gender, handedness, array placement in the brain, and other static information about the device or the subject. A separate network can transform the user profile and/or digital history into user embeddings 1110. During fine-tuning, the training module 468 can freeze the user embedding 1110.

Figure 12:
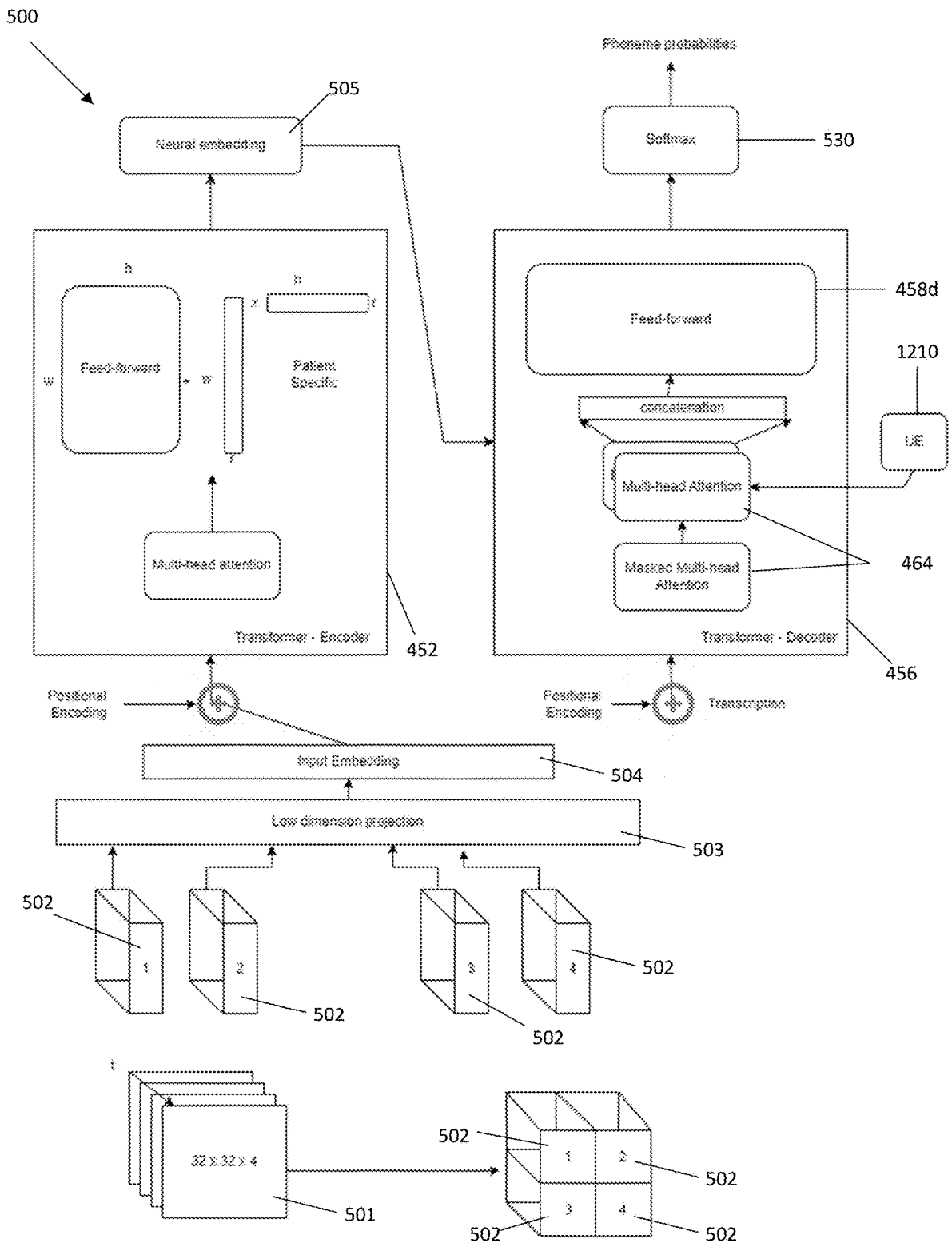
FIG. 12 depicts a NFM architecture adapted to include a subject embedding in a decoder, in accordance with illustrative embodiments.

In some embodiments, the NFM can include a decoder adapted to include a subject embedding. FIG. 12 shows an embodiment of an NFM architecture 500 adapted to include a subject embedding 1210 in a decoder, in accordance with example embodiments. In the depicted embodiment, the NFM architecture 500 includes an encoder 452 that receives input embeddings 504 generated from a low-dimension projection 503 of neural data that, in some cases, can have been divided into patches 502 from frames 501 of the neural data. The encoder 452 can generate neural embeddings 505, which can in turn be fed through a decoder 456 to provide an output associated with the neural data (e.g., phoneme probability). In this embodiment, the decoder 456 the one or more attention modules 464 of the decoder module 456 can receive the output from the encoder module 452 along with a subject embedding 1210. The subject embedding 1210 can include the subject's preferred vocabulary and personalized sentences. Personalized sentences can include common command-like speech. One or more attention modules 464 of the decoder module 456 can attend to the input sequence from the encoder module 452 and the subject embedding 1210 in order to achieve the personalization. The outputs of the attention modules 464 can be concatenated prior to the feedforward network module 458d of the decoder module 456 receiving them. In some embodiments, the concatenation can be linearly mapped prior to the feedforward network module 458d of the decoder module 456 receiving it. The feedforward network module 458d of the decoder module 456 can generate a decoded representation which can be input to a softmax layer 530 to generate phoneme probabilities.

Figure 13:
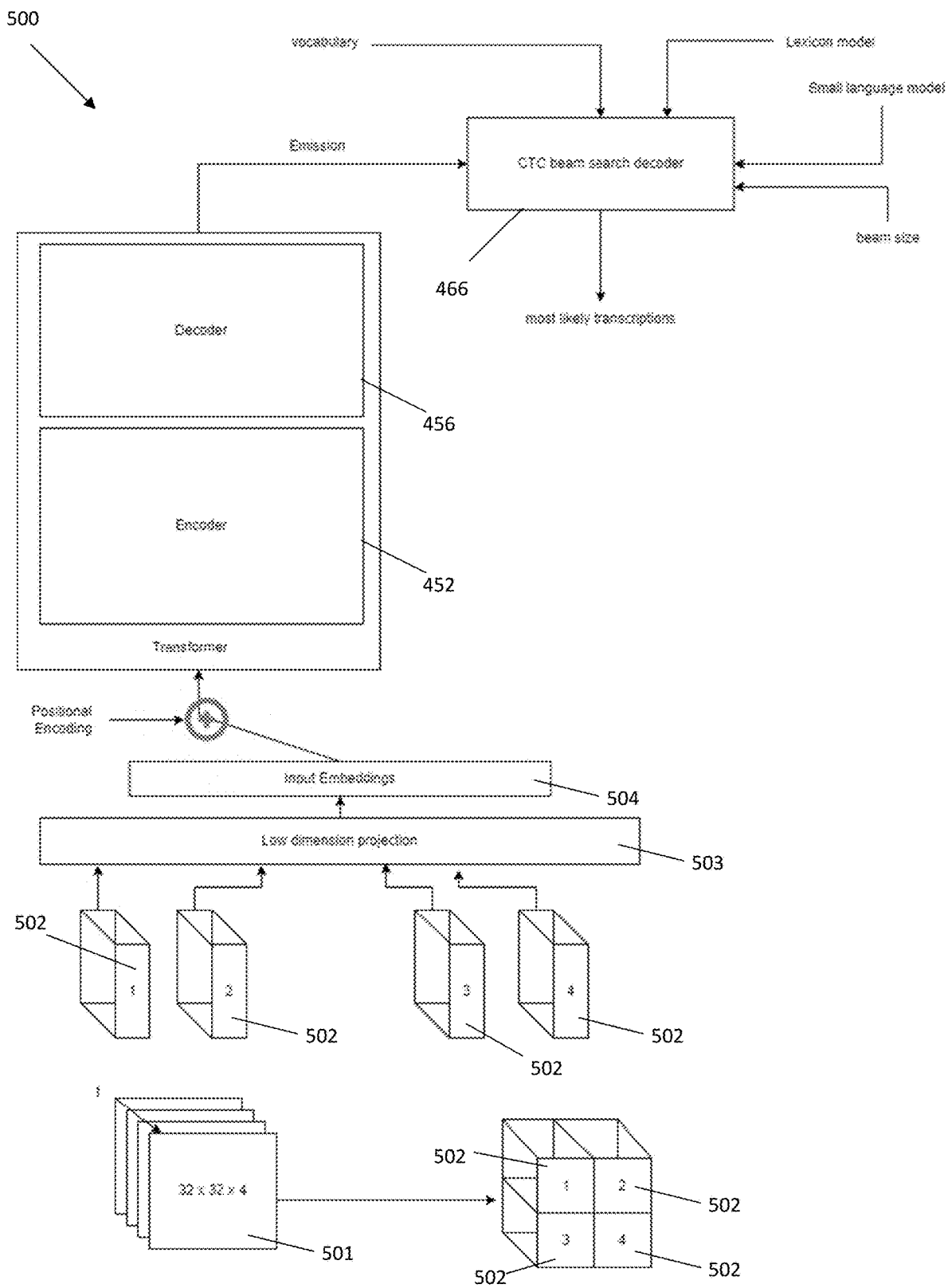
FIG. 13 depicts a NFM architecture adapted to predict speech via a beam search decoder, in accordance with illustrative embodiments.

In some embodiments, the NFM can include a beam search decoder adapted to predict a most likely transcript based on the phoneme probabilities. FIG. 13 shows an embodiment of an NFM architecture 500 adapted to predict speech via a beam search decoder, in accordance with example embodiments. In the depicted embodiment, the NFM architecture 500 includes an encoder 452 that receives input embeddings 504 generated from a low-dimension projection 503 of neural data, which can generate neural embeddings 505 that are fed through a decoder 456 to provide an output associated with the neural data (e.g., phoneme probability), as described above. In this embodiment, the NFM architecture 500 further includes a beam search decoder module 466 that can receive a number of parameters in addition to the emission from the decoder module 456 to create the most likely transcription. In some embodiments, the beam search decoder module 466 can be a CTC beam search decoder. The parameters can include one or more of the following: a lexicon model, a small language model, along with the beam size, and an associated vocabulary. The lexicon model can provide prior knowledge to most likely phoneme sequences. The small language model can be an N-gram mode that has been tailored to the user's language history. The beam size adjusts the number of ways a decoder would evaluate to generate the most likely sequence. The vocabulary parses the emission matrix by mapping token to indices. Once the transcription has been predicted, the output of the beam search decoder module 466 can have several functions. In some embodiments, the output of the beam search decoder module 466 can be used to command effector devices such as opening an app on a smartphone. The output of the beam search decoder module 466 can be connected to an effector device such that the effector device can respond to the brain signals of the subject.

In some embodiments, the encoder and decoder transformer blocks along with the beam search decoder module 466 can predict motor commands based on decoded brain signals. The motor commands can be used to command effector devices to move a cursor on a computer device, decode handwritings to texts, and typing on a keyboard.

Figure 15:
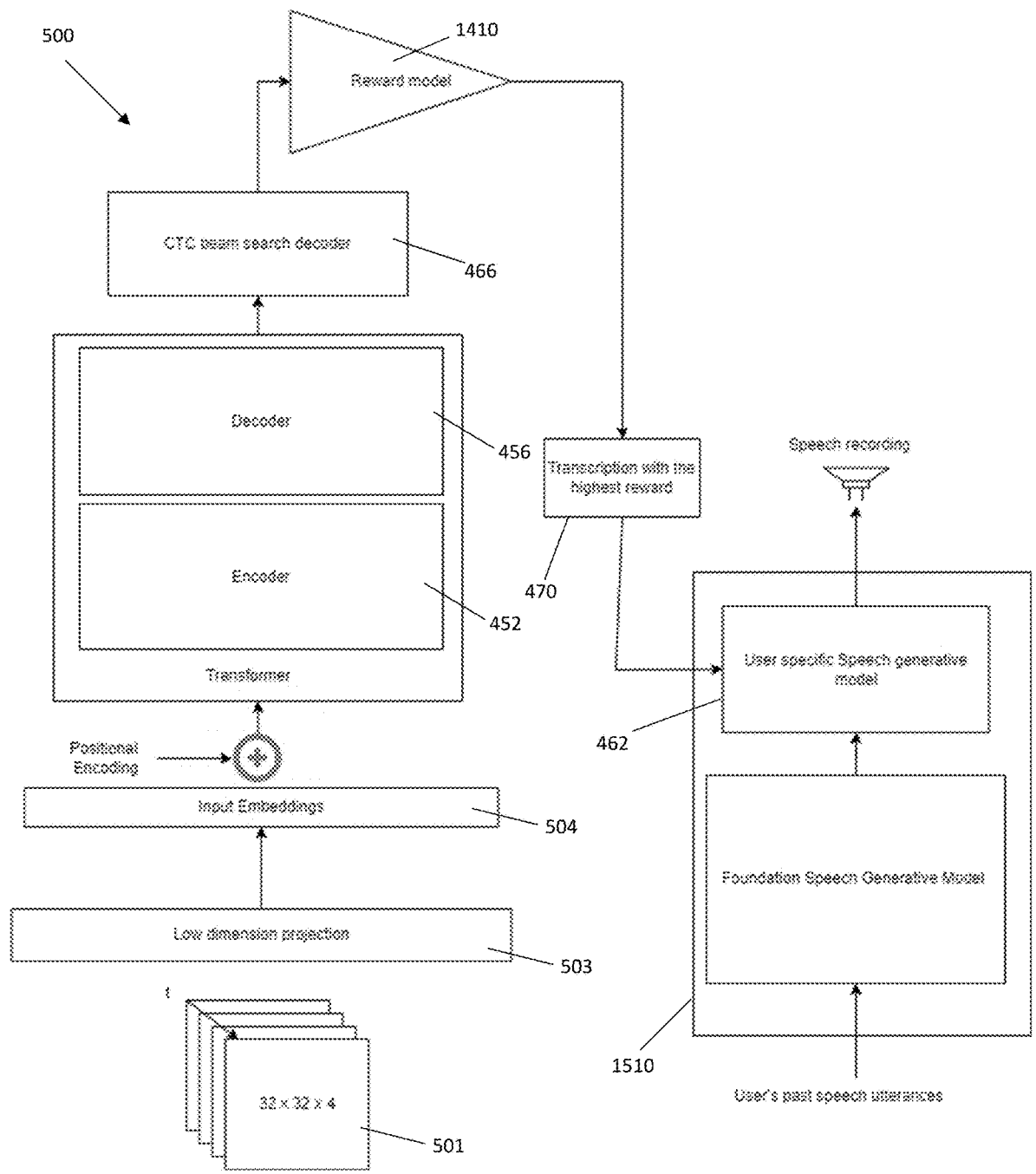
FIG. 15 depicts a NFM architecture adapted to generate speech based on speech prediction, in accordance with illustrative embodiments.

In some embodiments, the output from the transformer model can be used to generate speech using the speech synthesis module 462, as shown in FIG. 15. This can also be extended to an avatar of the subject displaying motor movements such as hand gestures and facial expressions based on the prediction of the motor commands.

Figure 14:
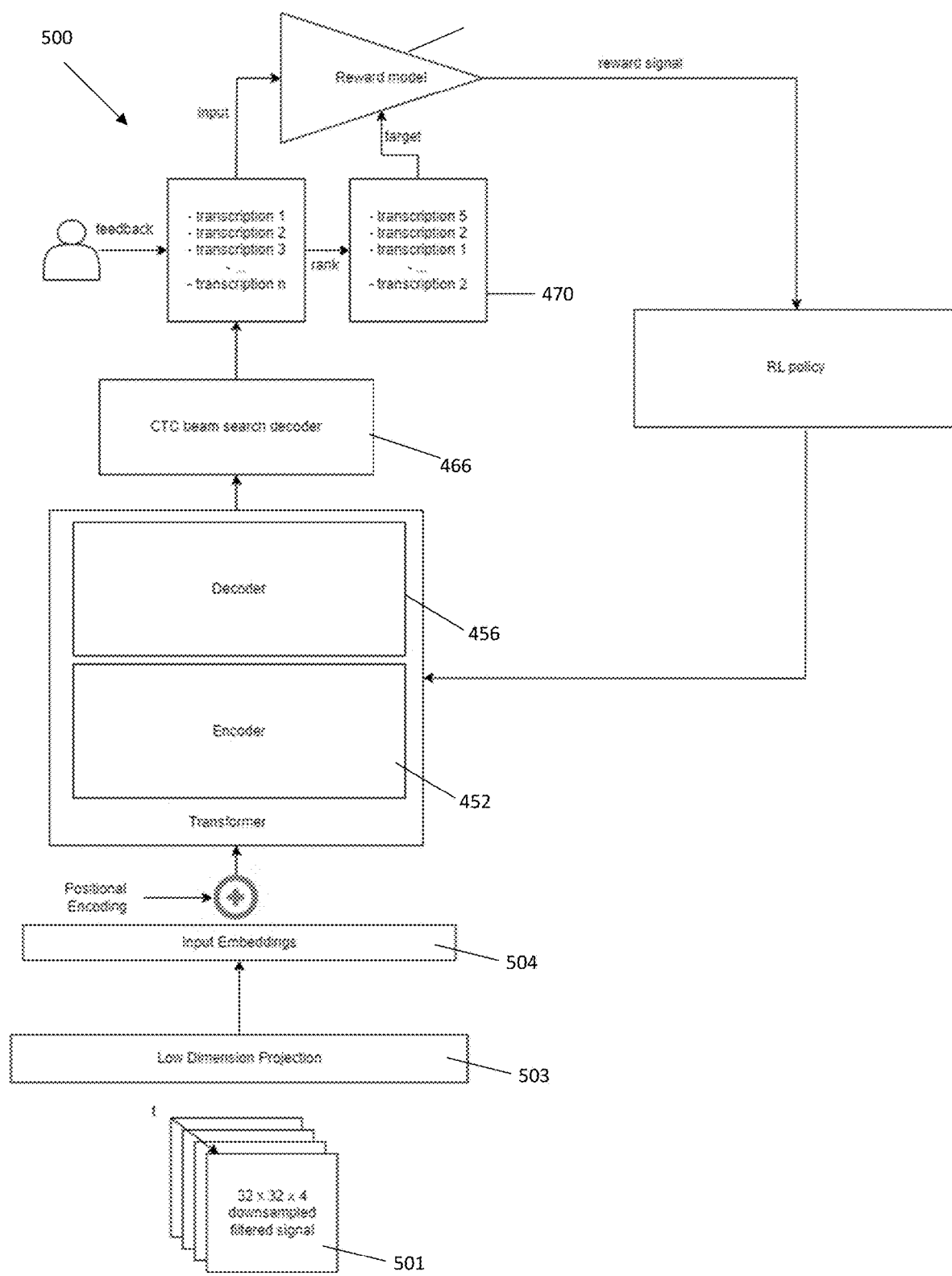
FIG. 14 depicts a NFM architecture adapted to correct predicted speech via a reward model, in accordance with illustrative embodiments.

In some embodiments, the NFM can include a reward model adapted to correct predicted transcripts. FIG. 14 shows an embodiment of an NFM architecture 500 adapted to correct predicted speech via a reward model 1410, in accordance with example embodiments. In the depicted embodiment, the NFM architecture 500 includes an encoder 452 that receives input embeddings 504 generated from a low-dimension projection 503 of neural data, which can generate neural embeddings 505 that are fed through a decoder 456 to provide an output associated with the neural data (e.g., phoneme probability), as described above. In this embodiment, the NFM architecture 500 further includes a reward model 1410 that is fed the output from the beam search decoder module 466. In some embodiments, the reward model 1410 can be determined through reinforcement learning from human feedback, RLHF. The reward model 1410 can be used to rank the most likely transcription determined by the beam search decoder module 466. When the beam search decoder module 466 generates transcriptions, the reinforcement learning module 470 can prompt the user to rank them based on the user's true intent. In some embodiments, the user can provide feedback in a plurality of categories including quality, coherence, and relevance. The feedback from the user can be used to train the reward model 1410. The reinforcement learning module 470 can guide the learning based on a mapping of the user feedback to a numerical reward. In some embodiments, the reinforcement learning module 470 can include at least one of a policy gradient method, actor-critic, and proximal policy optimization. The reinforcement learning module 470 can adjust at least one of the parameters of the NFM to maximize the expected cumulative reward, thus improving the performance of the NFM. In the constraint of a reinforcement learning problem, a policy can be the NFM that takes in user neural data and returns a transcription. An action space of this policy can be all the vocabulary of the NFM. An observation space can be a distribution of possible input sequences. The reward model can output a scalar reward. A reinforcement policy gradient method can then optimize the original NFM with respect to the reward model.

In some embodiments, the NFM can include a speech generation model 1510 adapted to generate speech based on the transcription or directly from the embeddings generated by the transformer decoder blocks. FIG. 15 shows an embodiment of an NFM architecture 500 adapted to generate speech based on the predicted speech transcriptions, in accordance with example embodiments. In the depicted embodiment, the NFM architecture 500 includes an encoder 452 that receives input embeddings 504 generated from a low-dimension projection 503 of neural data, which can generate neural embeddings 505 that are fed through a decoder 456 to output provide an output associated with the neural data (e.g., phoneme probability), as described above. In this embodiment, the NFM architecture 500 further includes a reinforcement learning module 470. The transcription with the highest reward determined by the reinforcement learning module 470 can be input to the speech generation model 1510. The speech generation model 1510 can include a speech synthesis module 462. In some embodiments, the speech synthesis module 462 can receive portions of the subject's digital history to generate speech in the style of the subject. For example, the portions of the subject's digital history can include speech utterances and/or videos of the subject speaking. The speech synthesis module 462 can generate speech sounds and/or videos based on the recorded brain signals and the subject's digital history. The speech synthesis module 462 can include at least one of a pre-trained diffusion speech generative model and a user-specific speech generative model. The speech generation model 1510 can be connected to a speaker device through which the speech synthesis module 462 can vocalize the transcription with the highest reward as determined by reinforcement learning module 470.

Figure 16A:
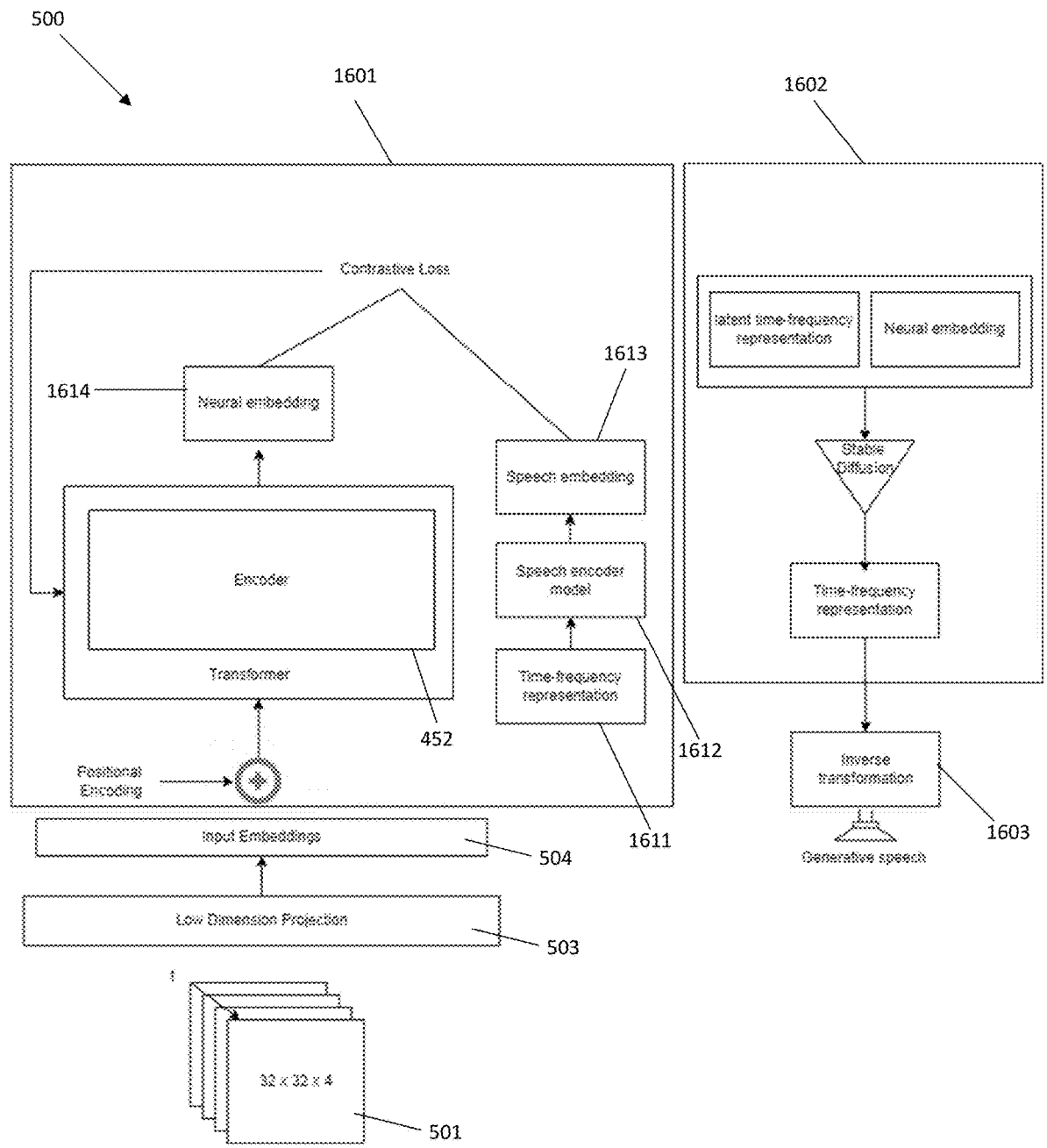
FIG. 16A depicts a NFM architecture adapted to align neural embeddings with speech embeddings to generate speech, in accordance with illustrative embodiments.

In some embodiments, the NFM can include a generative speech module adapted to generate speech based on aligning neural embeddings with speech embeddings. FIG. 16A shows an embodiment of an NFM architecture 500 adapted to align neural embeddings with speech embeddings to generate speech, in accordance with example embodiments. In the depicted embodiment, the NFM architecture 500 includes an encoder 452 that receives input embeddings 504 generated from a low-dimension projection 503 of neural data, which can generate neural embeddings 1614. In this embodiment, the NFM architecture 500 generates speech embeddings 1613 from the neural embeddings 1614 that are fed into a speech encoder model 1612, which is used to generate a time-frequency representation 1611 from the neural data, which are then utilized to guide a generative speech module 1602. The aligned neural embeddings can be used to generate speech using stable diffusion. In some embodiments, the neural encoder model 1601 can receive neural data and the corresponding speech data of a user's past speech utterances (e.g., audio recordings). The speech data can be transformed to a time-frequency representation 1611, such as a mel-spectrogram. Speech embeddings can then be extracted by passing the time frequency representation 1611 to a automatic speech recognition module 1612 (e.g., wav2vec2).

The neural embeddings can be extracted using one of the previously discussed encoder modules (e.g., encoder module 452). The parameters of the neural encoder model 1601 can be updated using a contrastive loss that increases the similarity between the neural embeddings and the speech embeddings. Increasing the similarity between certain neural embeddings and speech embeddings can align them closely such that the neural embeddings can be interpreted based on proximity to certain speech embeddings.

The resulting neural embeddings from neural encoder model 1601 that have been closely aligned to speech embeddings can be used to guide a generative speech module 1602. The generative speech module 1602 can use stable diffusion techniques to generate a time-frequency representation of the corresponding speech by denoising a latent time-frequency representation of a randomized speech using the neural embeddings over several iterations. The final generated speech time-frequency representation can then be inversely transformed 1603 back to the original domain and played back from a speaker device.

In some embodiments, the neural encoder model 1601 can be a multitask neural encoder model 1601. The multitask neural encoder model 1601 can be trained on a predetermined set of tasks at each time step. The multitask model 1601 can have a loss function associated with every task for which it has to optimize. During training, similar tasks that are easier to decode can be grouped together and introduced to the multitask model 1601 early on. More difficult tasks can be grouped and introduced later in the training of the multitask model 1601. This staged introduction can enable the multitask model 1601 to learn a neural embedding representation that can be generalized over a variety of different tasks by mimicking how a human learns. For example, the neural encoder model 1601 can be trained on tasks that have distinct differences before being trained on tasks that have subtle differences.

The multitask model 1601 can receive a mixed set of tasks such that the model 1601 can optimize via a weighted loss function over the set of tasks. The weights of each loss function can be adjusted adaptively by reducing the gradients on easier tasks so that the model 1601 can learn more difficult tasks. When the gradient is reduced on an easier task, the error between the predicted speech and the actual speech is reduced, which can help the neural encoder model 1601 to proceed to more difficult tasks.

In some embodiments, the multitask model 1601 can have more parameters than the number of data samples used to train it. This can lead to the multitask model 1601 becoming overconfident in its predictions and not generalizing to new unseen tasks. To combat the overconfidence of the multitask model 1601, a variety of regularization and data augmentations can be applied to improve the generalization of the multitask model 1601. The amount of regularization can also be increased as the training progress to avoid overfitting to the training dataset (2101). The data augmentation can include adding noise to the data and learning how to denoise it prior to generating speech or movement.

In some embodiments, the data can be augmented by replacing a random portion of the microelectrode array data with its noisier self. This can help make the multitask model 1601 robust to variabilities in the electrode array. For example, a robust multitask model 1601 can predict a representation based on the electrode array with noisy electrode data.

In some embodiments, original microelectrode array data corresponding to a certain action, such as speaking the word "father" can be augmented by adding a weighted mix of one or more samples with different labels wherein the subject was speaking different words. This can lower the confidence of the multitask model 1601 in producing the correct label for the original sample and increase its generalization. As such, the confidence of the neural encoder model 1601 can be lowered to mitigate the potential of overfitting to noise in the neural training data.

In some embodiments, a portion of the original microelectrode array data can be replaced by a portion of a different sample. This can introduce more intricate confusion to the multitask model 1601 that can make it more difficult for the multitask model 1601 to overfit to noise in the neural data. With portions from other neural samples, the multitask model 1601 can learn the important portions of the neural signals instead of the irrelevant portions which increases the generalization of the multitask model 1601.

In some embodiments, the neural encoder model 1601 can be used to perform zero- or few-shot classification. Zero-shot classification is when a model that previously trained on several tasks can be used as an encoder to extract representations from unseen data for unseen tasks. Few-shot classification is when a model that previously trained on several tasks can be used as an encoder to extract representations from data for tasks seen a few times. As the neural encoder model 1601 can be more robust, the representations can be stronger which enables deploying the neural encoder model 1601 without having to fine-tune it on new data. For example, neural encoder model 1601 can have learned the neural embeddings for a few words. Instead of teaching the neural encoder model 1601 new words, a vocabulary of new words can be created using the existing neural encoder model 1601. At inference, the new words can be compared against the existing vocabulary and the additional new words using k-nearest neighbors. This can be extended to motor decoding wherein the neural encoder model 1601 can be used to extract new gestures that it has not seen before. Through creating a database of new labeled gestures, the neural encoder model 1601 can find nearest gestures to an unseen gesture at inference. For example, considering gesture states including up, down, left, and right, if the neural encoder model 1601 determines that the neural embedding is nearest the "up" gesture state than any of the other gesture states, then neural encoder model 1601 can predict the "up" gesture state is being selected.

In some embodiments, the knowledge learned from the multitask neural encoder model 1601 can be taught to a smaller model that replicates one or more of the behaviors of the neural encoder model 1601 using knowledge distillation. This smaller model can be useful in deploying the neural encoder model 1601 on mobile and edge devices where computation resources can be limited and, in some cases, can also help improve the neural encoder model 1601 generalizations. A subset of the samples that correspond to desired tasks can be used for distillation of the smaller model. During training, the samples can be passed to both the neural encoder model 1601 and the smaller model, where a loss function can be defined as the difference between the predictions of the two models. During distillation, the parameters of the smaller model can be updated accordingly.

Figure 16B:
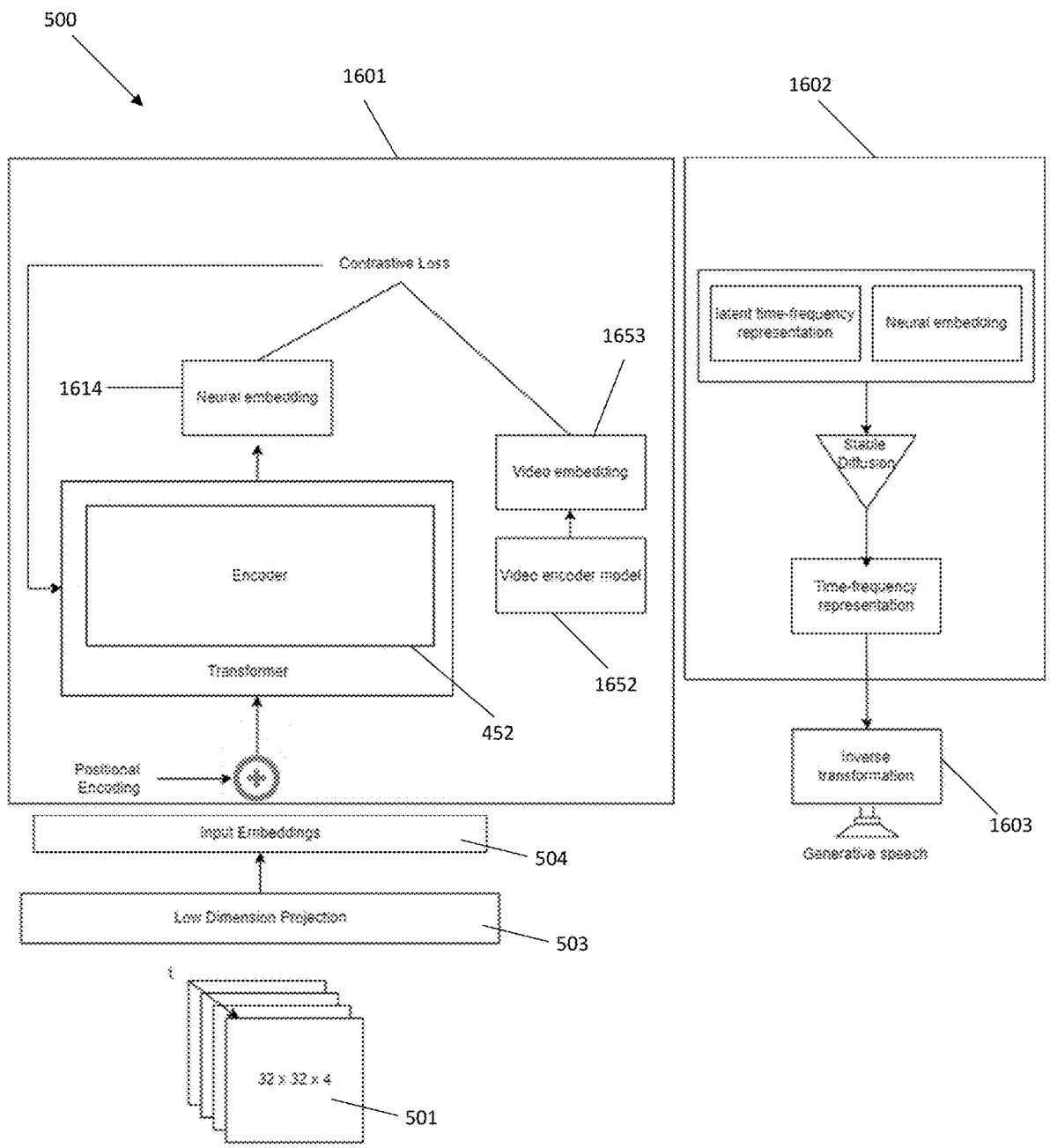
FIG. 16B depicts a NFM architecture adapted to align neural embeddings with video embeddings to generate video, in accordance with illustrative embodiments.

The NFM architecture 500 can be generalized to video generation as well. FIG. 16B shows an embodiment of an NFM architecture 500 adapted to align neural embeddings with video embeddings to generate video, in accordance with example embodiments. The embodiment of the NFM architecture 500 shown in FIG. 16B differs from the embodiment shown in FIG. 16A in that it is adapted for video. In particular, the depicted embodiment of the NFM architecture 500 includes an encoder 452 that receives input embeddings 504 generated from a low-dimension projection 503 of neural data, which can generate neural embeddings 1614. In this embodiment, the NFM architecture 500 generates video embeddings 1653 from the neural embeddings 1614, which are fed into a video encoder model 1652. The output of the video encoder model 1652 can be utilized to guide a generative speech module 1602. The generalization can be done by using video data from the subject's digital history making hand gestures or speaking. Video encoder model 1652 can extract video representations from the subject's digital history to generate one or more video embeddings 1653. The neural encoder model 1601 can perform contrastive loss on the neural embedding 1614 and the video embedding 1653 to align neural embeddings with certain video embeddings. The aligned neural embeddings can be used to generate video of the subject based on predictions of movement using stable diffusion, as described in FIG. 16A. For example, neural embedding can be used alongside video embeddings to generate an avatar of the subject's face speaking displayed on a monitor. In another embodiment, neural embeddings can be used alongside video embedding to generate a video of the subject's moving their arms.

Figure 17:
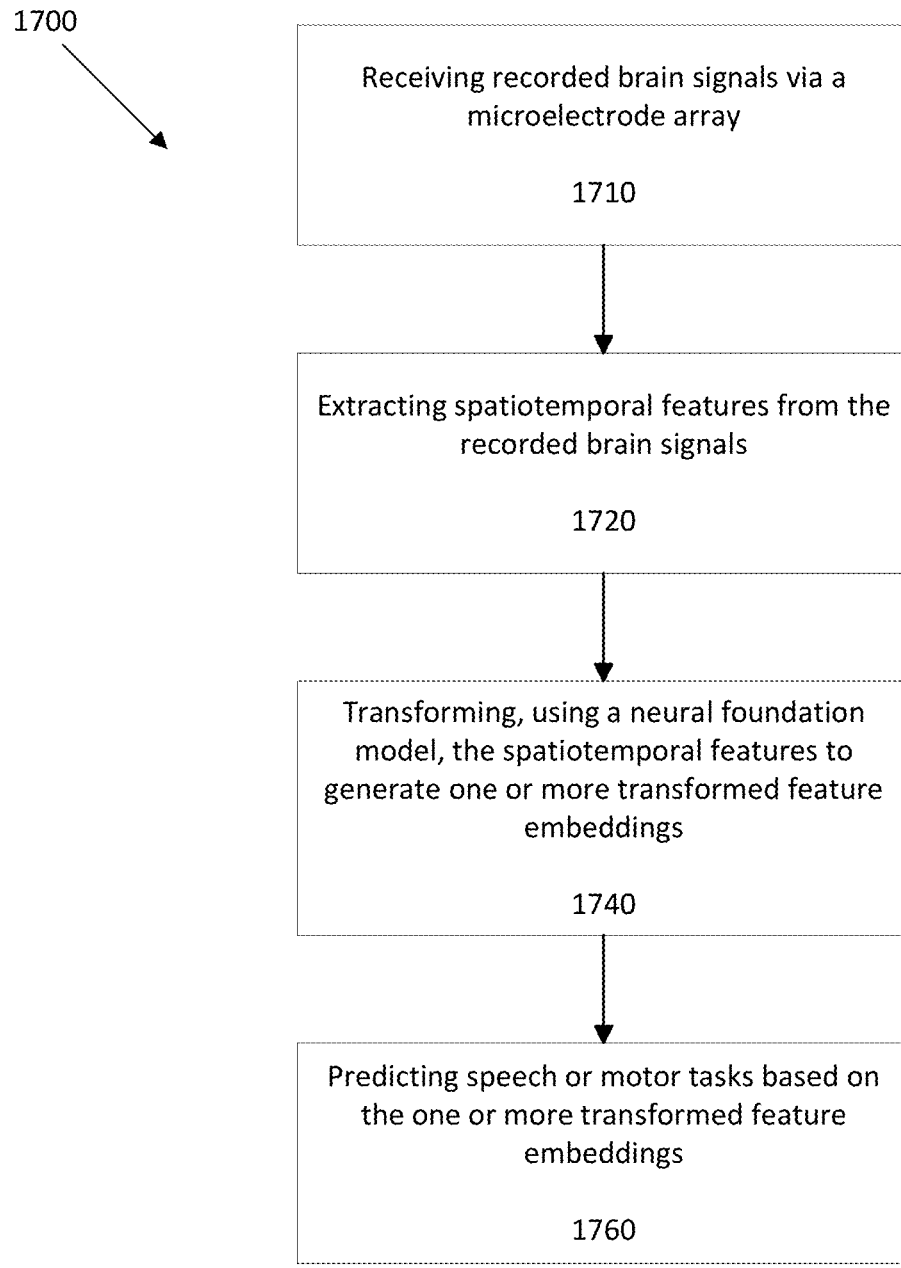
FIG. 17 depicts an illustrative method of decoding speech, in accordance with example embodiments.

FIG. 17 shows an illustrative method 1700 of decoding speech. In various embodiments, the method 1700 can be embodied as software, hardware, firmware, and various combinations thereof. In various embodiments, the method 1700 can be executed by and/or between a variety of different devices or systems. For example, various combinations of steps of the method 1700 can be executed by the neural device 110, the external device 130, and/or other devices communicatively coupled to the aforementioned components. In various embodiments, the system(s) executing the method 1700 can utilize distributed processing, parallel processing, cloud processing, and/or edge computing techniques. For brevity, the execution of the method 1700 is generally described below; however, it should be understood that the functions can be individually or collectively executed by one or multiple devices or systems described in connection with FIG. 1.

Step 1710 includes receiving recorded brain signals via a microelectrode array. The microelectrode array can include non-penetrating cortical surface microelectrodes. In some embodiments, the microelectrode array can be electrode array 180.

Step 1720 can include extracting one or more features from the recorded brain signals. In some embodiments, the extracting can include dividing the three-dimensional array of recorded brain signals into a plurality of patches 502. The extracting can be performed by the feature extraction module 450.

Step 1730 can include converting the one or more extracted features into one or more feature embeddings. In some embodiments, the one or more feature embeddings can include at least a temporal representation and a spatial representation of the recorded brain signals. The conversion can be performed by the feature extraction module 450.

Step 1740 can include transforming, by one or more encoders, the one or more feature embeddings. The one or more encoders can include one or more attention modules. The one or more attention modules can weigh the importance of elements in an input and adjust their influence on the output. The transforming can be performed by a feed-forward network module 458. In some embodiments, the one or more encoders can include encoder module 452. In some embodiments, the transforming can include applying a temporal attention block to the temporal representation and a spatial attention block to the spatial representation. In some embodiments, the method 1700 can further include concatenating at least the temporal attention and the spatial attention.

In some embodiments, the one or more encoders can receive one or more subject-specific embeddings. In some embodiments, the subject-specific embeddings can be generated by the subject-specific encoder module 460. In some embodiments, the one or more encoders can transform the one or more subject-specific embeddings. In some embodiments, a weighted sum can be applied to the transformed extracted feature embeddings and the transformed subject-specific embeddings. In some embodiments, the output of the weighted sum can be concatenated with a user embedding representing a profile of the user.

Step 1750 can include predicting, by one or more decoders, phonemes based on the one or more transformed feature embeddings. In some embodiments, the one or more decoders can include decoder module 456.

Step 1760 can include predicting speech based on the predicted phonemes. In some embodiments, the predicted speech can be generated by the beam search decoder module 466. In some embodiments, the predicting speech can include aligning, by a beam search decoder, the predicted phonemes based on one or more language constraints. In some embodiments, the beam search decoder module 466 can generate a predicted transcription based on the aligning. In some embodiments, the beam search decoder module 466 can be a connectionist temporal classification beam search decoder. In some embodiments, the speech can be vocalized by a speech synthesis module 462.

It should further be noted that although the functions and/or steps of the method 1700 are depicted in a particular order or arrangement, the depicted order and/or arrangement of steps and/or functions is simply provided for illustrative purposes. Unless explicitly described herein to the contrary, the various steps and/or functions of the process 200 can be performed in different orders, in parallel with each other, in an interleaved manner, and so on.

FIG. 18 shows a block diagram of an example computing device 1800 that implements various features and processes, according to example embodiments of this disclosure. For example, computing device 1800 can function as the server 435, the clients 480, the neural interface 410, or a portion or combination thereof in some embodiments. Additionally, the computing device 1800 can partially or wholly host and deploy NFM architecture 500. The computing device 1800 can also perform one or more steps of the method 1700. The computing device 1800 can be implemented on any electronic device that runs software applications derived from compiled instructions, including without limitation personal computers, servers, smart phones, media players, electronic tablets, game consoles, email devices, etc. In some implementations, the computing device 1800 includes one or more processors 1807, one or more input devices 1804, one or more display devices 1806, one or more network interfaces 1808, and one or more computer-readable media 1812. Each of these components can be coupled by a bus 1810.

Display device 1806 includes any display technology, including but not limited to display devices using liquid crystal display (LCD) light-emitting diode (LED) technology. Processor(s) 1807 uses any processor technology, including but not limited to graphics processors and multi-core processors. Input device 1804 includes any known input device technology, including but not limited to a keyboard (including a virtual keyboard), mouse, track ball, and touch-sensitive pad or display. Bus 1810 includes any internal or external bus technology, including but not limited to ISA, EISA, PCI, PCI Express, USB, Serial ATA or FireWire. Computer-readable medium 1812 includes any non-transitory computer readable medium that provides instructions to processor(s) 1807 for execution, including without limitation, non-volatile storage media (e.g., optical disks, magnetic disks, flash drives, etc.), or volatile media (e.g., SDRAM, ROM, etc.).

Computer-readable medium 1812 includes various instructions 1814 for implementing an operating system (e.g., Mac OS®, Windows®, Linux). The operating system can be multi-user, multiprocessing, multitasking, multi-threading, real-time, and the like. The operating system performs basic tasks, including but not limited to: recognizing input from input device 1804; sending output to display device 1806; keeping track of files and directories on computer-readable medium 1812; controlling peripheral devices (e.g., disk drives, printers, etc.) which can be controlled directly or through an I/O controller; and managing traffic on bus 1810. Network communications instructions 1816 establish and maintain network connections (e.g., software for implementing communication protocols, such as TCP/IP, HTTP, Ethernet, telephony, etc.).

Speech decoding instructions 1818 can include instructions that implement the disclosed process for decoding speech based on recorded brain signals, as described throughout this disclosure. Application(s) 1820 can comprise an application that uses or implements the processes described herein and/or other processes. The processes can also be implemented in the operating system.

This disclosure is not limited to the particular systems, devices, and methods described, as these can vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to a "module" is a reference to one or more modules and equivalents thereof known to those skilled in the art, and so forth.

As used herein, the term "about" means plus or minus 10% of the numerical value of the number with which it is being used. Therefore, about 50 nm means in the range of 45 nm to 55 nm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of"

As used herein, the term "subject" includes, but is not limited to, humans and non-human vertebrates such as wild, domestic, and farm animals.

While the present disclosure has been illustrated by the description of example embodiments thereof, and while the embodiments have been described in certain detail, it is not the intention of the Applicants to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures can be made from such details without departing from the spirit or scope of the Applicant's general inventive concept.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Various of the above-disclosed and other features and functions, or alternatives thereof, can be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method comprising:
receiving recorded brain signals via a microelectrode array, the microelectrode array comprising non-penetrating cortical surface microelectrodes;
extracting spatiotemporal features from the recorded brain signals;
transforming, using a neural foundation model, the spatiotemporal features to generate one or more transformed feature embeddings, wherein the neural foundation model has been trained to associate spatiotemporal features from brain signals with at least one of speech or motor tasks, wherein the neural foundation model comprises an encoder;
receiving one or more subject-specific embeddings at the encoder;
transforming, by the encoder, the one or more subject-specific embeddings; and
applying a weighted sum based on the transformed feature embeddings and the transformed subject-specific embeddings; and
predicting speech or motor tasks based on the one or more transformed feature embeddings.

2. The method of claim 1, wherein the neural foundation model has been trained to associate spatiotemporal features from brain signals with a plurality of tasks.

3. The method of claim 1, wherein the weighted sum outputs an encoded representation of the transformed feature embeddings and the subject-specific embeddings, the method further comprising:
concatenating the encoded representation of the transformed feature embeddings and the subject-specific embeddings with a user embedding representing a profile of the user.

4. The method of claim 1, wherein the recorded brain signals comprise a plurality of frames ordered temporally in a three-dimensional array, the frames comprising recorded brain signals at different time steps, the method further comprising:
dividing the plurality of frames into a plurality of patches; wherein the spatiotemporal features are extracted from the plurality of patches.

5. The method of claim 1, the method further comprising:
tuning the encoder by freezing one or more parameters of the encoder and training one or more layers of the encoder.

6. The method of claim 1, wherein predicting speech comprises:
aligning, by a beam search decoder, predicted phonemes based on one or more language constraints; and
generating a predicted transcription based on the aligning.

7. A system comprising:
a microelectrode array comprising non-penetrating cortical surface microelectrodes; and
a computer system communicably coupled to the microelectrode array, the computer system comprising:
a processor; and
a memory coupled to the processor, the memory storing instructions that, when executed by the processor, cause the computer system to:
receive recorded brain signals via the microelectrode array, the microelectrode array comprising non-penetrating cortical surface microelectrodes;
extract spatiotemporal features from the recorded brain signals;
transform, using a neural foundation model, the spatiotemporal features to generate one or more transformed feature embeddings, wherein the neural foundation model has been trained to associate spatiotemporal features from brain signals with at least one of speech or motor tasks, wherein the neural foundation model comprises an encoder;
receive one or more subject-specific embeddings at the encoder:
transform, by the encoder, the one or more subject-specific embeddings:
apply a weighted sum based on the transformed feature embeddings and the transformed subject-specific embeddings; and
predict speech or motor tasks based on the one or more transformed feature embeddings.

8. The system of claim 7, wherein the neural foundation model has been trained to associate spatiotemporal features from brain signals with a plurality of tasks.

9. The system of claim 7, wherein:
the weighted sum outputs an encoded representation of the transformed feature embeddings and the subject-specific embeddings; and
the memory stores further instructions that, when executed by the processor, cause the computer system to:
concatenate the encoded representation of the transformed feature embeddings and the subject-specific embeddings with a user embedding representing a profile of the user.

10. The system of claim 7, wherein:
the recorded brain signals comprise a plurality of frames ordered temporally in a three-dimensional array, the frames comprising recorded brain signals at different time steps; and
the memory stores further instructions that, when executed by the processor, cause the computer system to:
divide the plurality of frames into a plurality of patches, wherein the one or more features are extracted from the plurality of patches.

11. The system of claim 7, wherein:
the memory stores further instructions that, when executed by the processor, cause the computer system to:
tune the encoder by freezing one or more parameters of the encoder and training one or more layers of the encoder.

12. The system of claim 7, wherein the memory stores further instructions that, when executed by the processor, cause the computer system to predicting speech by:
aligning, by a beam search decoder, predicted phonemes based on one or more language constraints; and
generating a predicted transcription based on the aligning.

13. A method comprising:
receiving recorded brain signals via a microelectrode array, the microelectrode array comprising non-penetrating cortical surface microelectrodes, wherein the recorded brain signals comprise a plurality of frames ordered temporally in a three-dimensional array, the frames comprising recorded brain signals at different time steps;
dividing the plurality of frames into a plurality of patches;
extracting spatiotemporal features from the recorded brain signals, wherein the spatiotemporal features are extracted from the plurality of patches;
transforming, using a neural foundation model, the spatiotemporal features to generate one or more transformed feature embeddings, wherein the neural foundation model has been trained to associate spatiotemporal features from brain signals with at least one of speech or motor tasks; and predicting speech or motor tasks based on the one or more transformed feature embeddings.

14. The method of claim 13, wherein the neural foundation model has been trained to associate spatiotemporal features from brain signals with a plurality of tasks.

15. The method of claim 14, wherein the neural foundation model comprises an encoder, the method further comprising:

receiving one or more subject-specific embeddings at the encoder;

transforming, by the encoder, the one or more subject-specific embeddings; and applying a weighted sum based on the transformed feature embeddings and the transformed subject-specific embeddings.

16. The method of claim 15, wherein the weighted sum outputs an encoded representation of the transformed feature embeddings and the subject-specific embeddings, the method further comprising:

concatenating the encoded representation of the transformed feature embeddings and the subject-specific embeddings with a user embedding representing a profile of the user.

17. A system comprising:

a microelectrode array comprising non-penetrating cortical surface microelectrodes; and a computer system communicably coupled to the microelectrode array, the computer system comprising:

a processor; and a memory coupled to the processor, the memory storing instructions that, when executed by the processor, cause the computer system to:

receive recorded brain signals via the microelectrode array, the microelectrode array comprising non-penetrating cortical surface microelectrodes, wherein the recorded brain signals comprise a plurality of frames ordered temporally in a three-dimensional array, the frames comprising recorded brain signals at different time steps;

divide the plurality of frames into a plurality of patches;

extract spatiotemporal features from the recorded brain signals, wherein the spatiotemporal features are extracted from the plurality of patches;

transform, using a neural foundation model, the spatiotemporal features to generate one or more transformed feature embeddings, wherein the neural foundation model has been trained to associate spatiotemporal features from brain signals with at least one of speech or motor tasks; and predict speech or motor tasks based on the one or more transformed feature embeddings.

18. The system of claim 17, wherein the neural foundation model has been trained to associate spatiotemporal features from brain signals with a plurality of tasks.

19. The system of claim 18, wherein:

the neural foundation model comprises an encoder; and the memory stores further instructions that, when executed by the processor, cause the computer system to:

receive one or more subject-specific embeddings at the encoder, transform, by the encoder, the one or more subject-specific embeddings, and apply a weighted sum based on the transformed feature embeddings and the transformed subject-specific embeddings.

20. The system of claim 19, wherein:

the weighted sum outputs an encoded representation of the transformed feature embeddings and the subject-specific embeddings; and the memory stores further instructions that, when executed by the processor, cause the computer system to:

concatenate the encoded representation of the transformed feature embeddings and the subject-specific embeddings with a user embedding representing a profile of the user.

* * * * *